(12) United States Patent
Wengreen et al.

(10) Patent No.: US 10,303,181 B1
(45) Date of Patent: May 28, 2019

(54) SELF-DRIVING VEHICLE SYSTEMS AND METHODS

(71) Applicants: Eric John Wengreen, Sammamish, WA (US); Wesley Edward Schwie, Minneapolis, MN (US)

(72) Inventors: Eric John Wengreen, Sammamish, WA (US); Wesley Edward Schwie, Minneapolis, MN (US)

( * ) Notice: Subject to any disclaimer, the term of this patent is extended or adjusted under 35 U.S.C. 154(b) by 0 days.

(21) Appl. No.: 16/205,013

(22) Filed: Nov. 29, 2018

(51) Int. Cl.
| G06Q 50/30 | (2012.01) |
| G01C 21/36 | (2006.01) |
| G08G 1/123 | (2006.01) |
| G05D 1/02 | (2006.01) |
| G05D 1/00 | (2006.01) |
| G01S 19/42 | (2010.01) |
| G01C 21/34 | (2006.01) |

(52) U.S. Cl.
CPC ............ *G05D 1/0291* (2013.01); *G01S 19/42* (2013.01); *G05D 1/0027* (2013.01); *G01C 21/34* (2013.01); *G05D 1/0088* (2013.01); *G05D 2201/0212* (2013.01); *G05D 2201/0213* (2013.01)

(58) Field of Classification Search
CPC ........ G05D 1/0291; G05D 3/00; G06Q 50/30; G01C 21/36; G08G 1/123
See application file for complete search history.

(56) References Cited

U.S. PATENT DOCUMENTS

| 4,212,069 A | 7/1980 | Baumann |
| 5,769,471 A | 6/1998 | Suzuki |
| 5,798,695 A | 8/1998 | Metalis |
| 5,871,063 A | 2/1999 | Young |
| 5,945,919 A | 8/1999 | Trask |
| 5,960,523 A | 10/1999 | Husby |
| 5,986,420 A | 11/1999 | Kato |
| 6,011,478 A | 1/2000 | Suzuki |
| 6,081,088 A | 6/2000 | Ishihara |
| 7,093,515 B2 | 8/2006 | Yamanoi |
| 7,298,250 B2 | 11/2007 | Inoue |
| 7,413,357 B2 | 8/2008 | Badalian |

(Continued)

OTHER PUBLICATIONS

Google Self-Driving Vehicle—Online prior to Apr. 13, 2016 at www.google.com/selfdrivingcar/.

(Continued)

*Primary Examiner* — Yuri Kan

(57) ABSTRACT

A vehicle management system can include a self-driving vehicle and a computer system that is communicatively coupled with a remote computing device of a rider. The vehicle management system can include a location tracking system configured to receive a first location data indicative of a drop-off location where the self-driving vehicle dropped off the rider. The location tracking system can receive a second location data indicative of locations of the remote computing device during a period from after the self-driving vehicle fleet drops off the rider to before the self-driving vehicle fleet picks up the rider. The computer system can be configured to prompt the self-driving vehicle to drive to an area within 100 feet of the drop-off location to pick up the rider in response to determining that the second location data is indicative of the remote computing device having returned to the area after being dropped off.

30 Claims, 11 Drawing Sheets

(56) References Cited

U.S. PATENT DOCUMENTS

| | | |
|---|---|---|
| 7,698,078 B2 | 4/2010 | Kelty |
| 7,777,619 B2 | 8/2010 | Yopp |
| 7,999,701 B1 * | 8/2011 | Xu .................. G08G 1/123 |
| | | 340/993 |
| 8,078,359 B2 | 12/2011 | Small |
| 8,180,379 B2 | 5/2012 | Forstall |
| 8,255,124 B2 | 8/2012 | Van Houtan |
| 8,325,025 B2 | 12/2012 | Morgan |
| 8,433,934 B1 | 4/2013 | On |
| 8,634,980 B1 | 1/2014 | Urmson |
| 8,700,251 B1 | 4/2014 | Zhu |
| 8,818,608 B2 | 8/2014 | Cullinane |
| 8,849,494 B1 | 9/2014 | Herbach |
| 8,874,305 B2 | 10/2014 | Dolgov |
| 8,948,993 B2 | 2/2015 | Schulman |
| 8,949,016 B1 | 2/2015 | Ferguson |
| 8,954,217 B1 | 2/2015 | Montemerlo |
| 8,954,252 B1 | 2/2015 | Urmson |
| 8,965,621 B1 | 2/2015 | Urmson |
| 8,996,224 B1 | 3/2015 | Herbach |
| 9,008,890 B1 | 4/2015 | Herbach |
| 9,019,107 B2 | 4/2015 | Biondo |
| 9,026,300 B2 | 5/2015 | Ferguson |
| 9,119,038 B2 | 8/2015 | Woods |
| 9,120,484 B1 | 9/2015 | Ferguson |
| 9,120,485 B1 | 9/2015 | Dolgov |
| 9,139,133 B2 | 9/2015 | Eng |
| 9,194,168 B1 | 11/2015 | Lu |
| 9,262,914 B2 | 2/2016 | Purushothaman |
| 9,272,713 B1 | 3/2016 | Dvoskin |
| 9,290,174 B1 | 3/2016 | Zagorski |
| 9,429,947 B1 | 8/2016 | Wengreen |
| 9,459,622 B2 | 10/2016 | Abhyanker |
| 9,514,623 B1 | 12/2016 | Urrutia |
| 9,527,217 B1 | 12/2016 | Lowy |
| 9,562,785 B1 * | 2/2017 | Racah ............. G01C 21/3438 |
| 9,646,356 B1 | 5/2017 | Schwie |
| 9,685,058 B2 | 6/2017 | Schmidt |
| 9,733,096 B2 | 8/2017 | Colijn |
| 9,915,949 B2 | 3/2018 | Schwie |
| 9,916,703 B2 | 3/2018 | Levinson |
| 9,953,283 B2 | 4/2018 | Sweeney |
| 9,953,539 B1 * | 4/2018 | Gkiotsalitis ............ G08G 1/202 |
| 10,036,642 B2 | 7/2018 | Ross |
| 10,050,760 B2 | 8/2018 | Ross |
| 10,082,789 B1 | 9/2018 | Szybalski |
| 10,093,324 B1 | 10/2018 | Szybalski |
| 10,115,029 B1 | 10/2018 | Day |
| 10,127,795 B1 | 11/2018 | Hwang |
| 2002/0077876 A1 | 6/2002 | O'Meara |
| 2002/0121291 A1 | 9/2002 | Daum |
| 2003/0195696 A1 | 10/2003 | Jones |
| 2004/0068354 A1 | 4/2004 | Tabe |
| 2004/0219933 A1 | 11/2004 | Faith |
| 2007/0096447 A1 | 5/2007 | Tabe |
| 2007/0132567 A1 | 6/2007 | Schofield |
| 2007/0198144 A1 | 8/2007 | Norris |
| 2008/0030906 A1 | 2/2008 | Sato |
| 2008/0144944 A1 | 6/2008 | Breed |
| 2009/0140886 A1 | 6/2009 | Bender |
| 2009/0287367 A1 | 11/2009 | Salinger |
| 2011/0059341 A1 | 3/2011 | Matsumoto |
| 2011/0098017 A1 | 4/2011 | Berry |
| 2012/0009845 A1 | 1/2012 | Schmelzer |
| 2012/0083960 A1 | 4/2012 | Zhu |
| 2012/0158251 A1 | 8/2012 | Van Houtan |
| 2013/0085817 A1 | 4/2013 | Pinkus |
| 2013/0132140 A1 | 5/2013 | Amin |
| 2013/0197674 A1 | 8/2013 | Lowry |
| 2013/0231824 A1 | 9/2013 | Wilson |
| 2013/0246301 A1 | 9/2013 | Radhakrishnan |
| 2014/0129132 A1 | 5/2014 | Yoshizu |
| 2014/0129951 A1 | 5/2014 | Amin |
| 2014/0172727 A1 | 6/2014 | Abhyanker |
| 2014/0316616 A1 | 10/2014 | Kugelmass |
| 2014/0336935 A1 | 11/2014 | Zhu |
| 2014/0350855 A1 | 11/2014 | Vishnuvajhala |
| 2015/0012833 A1 | 1/2015 | Foy |
| 2015/0046080 A1 | 2/2015 | Wesselius |
| 2015/0066284 A1 | 3/2015 | Yopp |
| 2015/0088421 A1 | 3/2015 | Foster |
| 2015/0120504 A1 | 4/2015 | Todasco |
| 2015/0148077 A1 | 5/2015 | Jelle |
| 2015/0149283 A1 | 5/2015 | Horstemeyer |
| 2015/0185034 A1 | 7/2015 | Abhyanker |
| 2015/0199619 A1 | 7/2015 | Ichinose |
| 2015/0248689 A1 | 9/2015 | Paul |
| 2015/0271290 A1 | 9/2015 | Tao |
| 2015/0295949 A1 | 10/2015 | Chizeck |
| 2015/0339928 A1 | 11/2015 | Ramanujam |
| 2015/0346727 A1 | 12/2015 | Ramanujam |
| 2015/0348221 A1 | 12/2015 | Pedersen |
| 2016/0027307 A1 | 1/2016 | Abhyanker |
| 2016/0034828 A1 | 2/2016 | Sarawgi |
| 2016/0034845 A1 | 2/2016 | Hiyama |
| 2016/0071056 A1 | 3/2016 | Ellison |
| 2016/0092976 A1 | 3/2016 | Marusyk |
| 2016/0116293 A1 | 4/2016 | Grover |
| 2016/0125735 A1 | 5/2016 | Tuukkanen |
| 2016/0140835 A1 | 5/2016 | Smith |
| 2016/0129880 A1 | 6/2016 | Cuddihy |
| 2016/0182170 A1 | 6/2016 | Daoura |
| 2016/0187150 A1 | 6/2016 | Sherman |
| 2016/0209220 A1 | 7/2016 | Laetz |
| 2016/0209843 A1 | 7/2016 | Meuleau |
| 2016/0216130 A1 | 7/2016 | Abramson |
| 2016/0227193 A1 | 8/2016 | Osterwood |
| 2016/0247095 A1 | 8/2016 | Scicluna |
| 2016/0247106 A1 | 8/2016 | Dalloro |
| 2016/0247109 A1 | 8/2016 | Scicluna |
| 2016/0264021 A1 | 9/2016 | Gillett |
| 2016/0277560 A1 | 9/2016 | Gruberman |
| 2016/0301698 A1 | 10/2016 | Katara |
| 2016/0342934 A1 | 11/2016 | Michalik |
| 2016/0360382 A1 | 12/2016 | Gross |
| 2016/0364812 A1 | 12/2016 | Cao |
| 2016/0364823 A1 | 12/2016 | Coa |
| 2016/0370194 A1 | 12/2016 | Colijn |
| 2017/0024393 A1 | 1/2017 | Choksi |
| 2017/0050321 A1 | 2/2017 | Look |
| 2017/0068245 A1 | 3/2017 | Scofield |
| 2017/0075358 A1 | 3/2017 | Zhang |
| 2017/0089715 A1 | 3/2017 | Guo |
| 2017/0090480 A1 | 3/2017 | Ho |
| 2017/0103490 A1 | 4/2017 | Haparnas |
| 2017/0127215 A1 | 5/2017 | Khan |
| 2017/0132540 A1 | 5/2017 | Haparnas |
| 2017/0147951 A1 | 5/2017 | Meyer |
| 2017/0147959 A1 | 5/2017 | Sweeney |
| 2017/0213165 A1 | 7/2017 | Stauffer |
| 2017/0248949 A1 | 8/2017 | Moran |
| 2017/0277191 A1 | 9/2017 | Fairfield |
| 2017/0300053 A1 | 10/2017 | Wengreen |
| 2017/0313321 A1 | 11/2017 | Jefferies |
| 2017/0316516 A1 | 11/2017 | Goldman-Shenhar |
| 2017/0316533 A1 | 11/2017 | Goldman-Shenhar |
| 2017/0316621 A1 | 11/2017 | Jefferies |
| 2017/0327082 A1 | 11/2017 | Kamhi |
| 2017/0337437 A1 | 11/2017 | Kanagaraj |
| 2017/0344010 A1 | 11/2017 | Rander |
| 2017/0352250 A1 | 12/2017 | de Barros Chapiewski |
| 2017/0357973 A1 | 12/2017 | Van Os |
| 2017/0363430 A1 | 12/2017 | Al-Dahle |
| 2017/0372394 A1 | 12/2017 | Chan |
| 2018/0075565 A1 | 3/2018 | Myers |
| 2018/0108103 A1 * | 4/2018 | Li .................. G06Q 20/322 |
| 2018/0109934 A1 | 4/2018 | Grube |
| 2018/0115924 A1 | 4/2018 | Harris |
| 2018/0126960 A1 | 5/2018 | Reibling |
| 2018/0130161 A1 | 5/2018 | Wengreen |
| 2018/0137693 A1 | 5/2018 | Raman |
| 2018/0156625 A1 | 6/2018 | Mangal |
| 2018/0157268 A1 | 6/2018 | Mangal |
| 2018/0191596 A1 | 7/2018 | Bhaya |

(56) References Cited

U.S. PATENT DOCUMENTS

| | | |
|---|---|---|
| 2018/0211540 A1 | 7/2018 | Bedegi |
| 2018/0211541 A1 | 7/2018 | Rakah |
| 2018/0220189 A1 | 8/2018 | Hodge |
| 2018/0225749 A1 | 8/2018 | Shoen |
| 2018/0225890 A1 | 8/2018 | Jales Costa |
| 2018/0357907 A1 | 12/2018 | Reiley |

OTHER PUBLICATIONS

Testa Autopilot—Online prior to Apr. 13, 2016 at www.technologyreview.com/s/600772/10-breakthrough-technologies-2016-tesla-autopilot/.
Tesla Model S Software Version 7—Autopilot—Online prior to Apr. 13, 2016 at www.teslamotors.com/presskit/autopilot.
BMW Heads Up Display—Online prior to Apr. 13, 2016 at www.autotrader.com/car-news/full-color-heads-up-display-to-debut-on-new-3-series-132586.
Uber Details—Online prior to Apr. 13, 2016 at www.wikihow.com/Use-Uber.
Raspberry Pi: How can I detect the direction of a sound—Online prior to Apr. 13, 2016 at www.quora.com/Raspberry-Pi-1/How-can-I-detect-the-direction-of-a-sound.
Wikipedia: Biometric Device—Downloaded on Aug. 19, 2016 from en.wikipedia.org/wiki/Biometric_device.
Self-Driving Cars Go Public; Uber Offers Rides in Pittsburgh—Downloaded on Aug. 19, 2016 from www.yahoo.com/news/uber-autonomous-cars-haul-people-125127470.html?ref=gs.
Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.
Zach Epstein, You'll be riding in self-driving cars as soon as next year, May 6, 2016, BGR.com, http://bgr.com/2016105'06/lyfl-self-driving-cars-2017/, pp. 1-5.
Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.
Explain That Stuff: Smoke Detectors—Downloaded on Sep. 28, 2018 from www.explainthatstuff.com/smokedetector.html.
Nittan: EV-DP Smoke Detector—Downloaded on Sep. 28, 2018 from nittan.co.uk/products/products/ev/ev-dp.
Wikipedia: Rain Sensor—Downloaded on Sep. 28, 2018 from en.wikipedia.org/wiki/Rain_sensor.
Nest: Split-Spectrum White Paper—Downloaded on Oct. 1, 2018 from nest.com/support/images/misc-assets/Split-Spectrum-Sensor-White-Paper.pdf.
How Police Visually Detect Drunk Drivers—Downloaded on Oct. 19, 2018 from thelaw.com/law/how-police-visually-detect-drunk-drivers.185.
Velodyne VLS-128 LiDAR Sensor—Downloaded on Oct. 22, 2018 from velodynelidar.com/vls-128.html.
Waymo's Suite of Custom-Built, Self-Driving Hardware—Downloaded on Oct. 22, 2018 from medium.com/waymo/introducing-waymos-suite-of-custom-built-self-driving-hardware-c47d1714563.
Lidar—Downloaded on Oct. 24, 2018 from en.wikipedia.org/wiki/Lidar.
Radar—Downloaded on Oct. 24, 2018 from en.wikipedia.org/wiki/Radar.
Assisted GPS—Downloaded on Nov. 19, 2018 from lifewire.com/assisted-gps-1683306.
How GPS Works—Downloaded on Nov. 19, 2018 from lifewire.com/iphone-gps-set-up-1683393.
Indoor Positioning System—Downloaded on Nov. 19, 2018 from en.wikipedia.org/wiki/Indoor_positioning_system.
LTE—Downloaded on Nov. 27, 2018 from en.wikipedia.org/wiki/LTE_(telecommunication).
OTDOA—Downloaded on Nov. 27, 2018 from en.wikipedia.org/wiki/OTDOA.
Ping for Beginners—Downloaded on Jan. 30, 2019 from https://social.technet.microsoft.com/wiki/contents/articles/30110.ping-for-beginners.aspx.

* cited by examiner

SELF-DRIVING VEHICLE SYSTEMS AND METHODS

BACKGROUND

Field

Various embodiments disclosed herein relate to vehicles. Certain embodiments relate to self-driving vehicles.

Description of Related Art

According to the National Highway Traffic Safety Administration, 37,133 people were killed in vehicle crashes in 2017 in the United States. Most vehicle deaths were caused by human errors. Self-driving vehicles can eliminate nearly all driving errors, which will save tens of thousands of lives per year. Self-driving vehicles, however, previously struggled to perform tasks required to transport people in an efficient manner. Simply knowing how to steer, brake, and accelerate is insufficient. Thus, there is a need for systems and methods that enable self-driving vehicles to perform actions required to transport people in an efficient manner.

SUMMARY

The ability of self-driving vehicles to save lives is so impressive that society has a moral imperative to develop self-driving technology such that it can be widely adopted. Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles can have unlimited attention spans and can process complex sensor data nearly instantaneously.

In some embodiments, a vehicle management system comprises a self-driving vehicle fleet having at least one of a first self-driving vehicle and a second self-driving vehicle. The self-driving vehicle fleet can be configured to transport a rider. (In some embodiments, the self-driving vehicle fleet only has one vehicle. In some embodiments, the self-driving vehicle fleet has hundreds of vehicles.) The first self-driving vehicle can drop off and then later pick up the rider. The second self-driving vehicle can drop off and then later pick up the rider. The first self-driving vehicle can drop off the rider, and then the second self-driving vehicle can later pick up the rider. The second self-driving vehicle can drop off the rider, and then the first self-driving vehicle can later pick up the rider.

In some embodiments, a vehicle management system comprises a computer system having at least one computer. The computer system can be configured to be communicatively coupled (e.g., one-time, intermittently, continuously) with a remote computing device of the rider. The computer system can be configured to be communicatively coupled (e.g., one-time, intermittently, continuously) with at least one of the first self-driving vehicle and the second self-driving vehicle.

In some embodiments, a vehicle management system comprises a location tracking system communicatively coupled (e.g., one-time, intermittently, continuously) with the computer system and configured to receive a first location data indicative of a drop-off location where the self-driving vehicle fleet dropped off the rider.

In some embodiments, the location tracking system is configured to receive a second location data indicative of at least one location of the remote computing device during at least a portion of a period from after when the self-driving vehicle fleet drops off the rider to before when the self-driving vehicle fleet picks up the rider.

In some embodiments, the computer system is configured to prompt at least one of the first self-driving vehicle and the second self-driving vehicle to drive to an area within 100 feet and/or within 250 feet of the drop-off location to pick up the rider in response to determining that the second location data is indicative of the remote computing device having returned to the area after being dropped off.

In some embodiments, the first location data comprises a first GPS location calculated by at least one of the first self-driving vehicle and the second self-driving vehicle. The second location data can comprise a second GPS location calculated by the remote computing device.

In some embodiments, the computer system is configured to prompt at least one of the first self-driving vehicle and the second self-driving vehicle to drive to the area in response to determining, based on the second location data, that the rider is not leaving the area (after having left the area and then having returned to the area).

In some embodiments, the first location data comprises a first GPS location based on at least a first radio signal and a second radio signal (and in some cases additional radio signals) received by at least one of the first self-driving vehicle and the second self-driving vehicle. In some embodiments, the second location data comprises a second GPS location based on at least a third radio signal and a fourth radio signal (and in some cases additional radio signals) received by the remote computing device.

In some embodiments, the first location data comprises a first GPS location calculated by at least one of the first self-driving vehicle and the second self-driving vehicle. The second location data can comprise a first indoor location calculated by the remote computing device based on information received via radio waves from an indoor positioning system.

In some embodiments, the computer system is configured to prompt at least one of the first self-driving vehicle and the second self-driving vehicle to drive to the area in response to determining, based on movement data from the remote computing device, that the rider is not leaving the area. The remote computing device can comprise at least one of an accelerometer, a gyroscope, and a Wi-Fi tracker. The movement data can be based on information from at least one of the accelerometer, the gyroscope, and the Wi-Fi tracker.

In some embodiments, the vehicle management system comprises program instructions configured to be executed by the remote computing device having at least one of an accelerometer, a gyroscope, and a Wi-Fi tracker. The program instructions can be configured to cause the remote computing device to send a first communication to the computer system in response to the remote computing device using at least one of the accelerometer, the gyroscope, and the Wi-Fi tracker to determine that the rider is not moving away from at least one of the area and the drop-off location. The computer system can be configured to prompt at least one of the first self-driving vehicle and the second self-driving vehicle to drive to the area in response to receiving the first communication.

In some embodiments, the program instructions are configured to cause the remote computing device to send a first communication to the computer system in response to the remote computing device using at least one of the accelerometer, the gyroscope, and the Wi-Fi tracker to determine that the rider is not moving in a manner indicative of leaving the area.

Some embodiments comprise program instructions configured to be executed by the remote computing device having at least one of an accelerometer and a gyroscope. The program instructions can be configured to cause the remote computing device to send a first communication to the computer system in response to the remote computing device using at least one of the accelerometer and the gyroscope to determine that the rider is not walking. The computer system can be configured to prompt at least one of the first self-driving vehicle and the second self-driving vehicle to drive to the area in response to receiving the first communication.

In some embodiments, the computer system comprises at least one processor and a memory having program instructions that when executed by the at least one processor cause the at least one processor to automatically prompt at least one of the first self-driving vehicle and the second self-driving vehicle to drive to an area within 100 feet and/or within 250 feet of the drop-off location to pick up the rider prior to a scheduled pick-up time in response to determining that the second location data is indicative of the remote computing device having returned to the area after being dropped off.

In some embodiments, the computer system comprises at least one processor and a memory having program instructions that when executed by the at least one processor are configured to cause the at least one processor to prompt the first self-driving vehicle to drive to an area within 100 feet and/or within 250 feet of the drop-off location to pick up the rider in response to determining that the second location data is indicative of the remote computing device having returned to the area after being dropped off.

In some embodiments, after prompting the first self-driving vehicle to drive to the area in response to determining that the second location data is indicative of the remote computing device having returned to the area, the program instructions are configured to cause the at least one processor to prompt the first self-driving vehicle to drive away from the area in response to determining that the second location data is indicative of the remote computing device moving away from at least one of the drop-off location and the area.

In some embodiments, the location tracking system is configured to receive the first location data indicative of the drop-off location where the first self-driving vehicle dropped off the rider. The computer system can be configured to prompt the second self-driving vehicle to drive to an area within 100 feet of the drop-off location to pick up the rider in response to determining that the second location data is indicative of the remote computing device having returned to the area after being dropped off.

In some embodiments, the computer system is configured to automatically prompt the first self-driving vehicle to drive to an area within 100 feet and/or within 250 feet of the drop-off location to pick up the rider in response to determining that the second location data is indicative of the remote computing device moving toward the area.

In some embodiments, the computer system is configured to automatically prompt the first self-driving vehicle to drive to an area within 100 feet and/or within 250 feet of the drop-off location to pick up the rider in response to determining that the second location data is indicative of the remote computing device moving toward the area for at least a predetermined amount of time.

In some embodiments, the computer system comprises at least one processor and a memory having program instructions that when executed by the at least one processor are configured to cause the at least one processor to cause the remote computing device to prompt the rider to at least one of request a ride, confirm the rider wants the ride, cancel a pending pick up, enter a pick-up time, and enter a pick-up location. The program instructions can be configured to cause the at least one processor to cause the remote computing device to prompt the rider in response to determining that the second location data is indicative of the remote computing device moving toward an area within 100 feet and/or within 250 feet of the drop-off location.

In some embodiments, at least one of the computer system and the remote computing device is configured to estimate a first amount of time that the first self-driving vehicle is away from a first area within 100 feet, within 900 feet, and/or within one mile of the drop-off location. At least one of the computer system and the remote computing device can be configured to estimate a second amount of time that the remote computing device is away from a second area within 100 feet, within 900 feet, and/or within 0.4 miles of the drop-off location. The computer system can be configured to automatically prompt the first self-driving vehicle to drive to a third area within 100 feet and/or within 250 feet of the drop-off location to pick up the rider in response to determining that the second location data is indicative of the remote computing device moving toward the area and in response to determining that the first amount of time is at least fifty percent of the second amount of time.

In some embodiments, the computer system comprises a memory having a third location data indicative of a pick-up location selected by the rider. The computer system can be configured to automatically prompt the first self-driving vehicle to drive to an area within 100 feet and/or within 250 feet of the pick-up location to pick up the rider in response to determining that the second location data is indicative of the remote computing device having arrived at the area.

In some embodiments, the memory comprises a pick-up time (e.g., data representing a time) selected by the rider. The computer system can be configured to override the pick-up time by prompting the self-driving vehicle to drive to the area to pick up the rider. The computer system can be configured to override the pick-up time in response to determining that the second location data is indicative of the remote computing device having arrived at the area prior to the pick-up time.

In some embodiments, the computer system comprises at least one processor and a memory having a pick-up time selected by the rider and having a third location data indicative of a pick-up location selected by the rider. The memory can comprise program instructions that when executed by the at least one processor are configured to cause the at least one processor to cause the remote computing device to prompt the rider to at least one of request a ride, confirm the rider wants the ride, and cancel a pending pick up. The program instructions can be configured to cause the at least one processor to cause the remote computing device to prompt the rider in response to determining that the second location data is indicative of the remote computing device having arrived at an area within 100 feet and/or within 250 feet of the pick-up location prior to the pick-up time.

In some embodiments, the computer system comprises a memory having a third location data indicative of a pick-up location selected by the rider. The computer system can be configured to automatically prompt the first self-driving vehicle to drive to an area within 100 feet and/or within 250 feet of the pick-up location to pick up the rider in response to determining that the second location data is indicative of the remote computing device moving toward the area.

Some embodiments comprise using a vehicle management system comprising a self-driving vehicle fleet having at least one of a first self-driving vehicle and a second self-driving vehicle. The fleet can be configured to transport a rider.

Some embodiments comprise receiving, by the vehicle management system, a first location data indicative of a drop-off location where the self-driving vehicle fleet dropped off the rider. Some embodiments comprise receiving, by the vehicle management system, a second location data indicative of at least one location of a remote computing device of the rider during at least a portion of a period from after when the self-driving vehicle fleet drops off the rider to before when the self-driving vehicle fleet picks up the rider.

Some embodiments comprise prompting, by the vehicle management system, the first self-driving vehicle to drive to an area within 100 feet and/or within 250 feet of the drop-off location to pick up the rider in response to determining that the second location data is indicative of the remote computing device having returned to the area after being dropped off.

In some embodiments, the first location data comprises a first GPS location calculated by at least one of the first self-driving vehicle and the second self-driving vehicle. The second location data can comprise a second GPS location calculated by the remote computing device. Some embodiments comprise prompting the first self-driving vehicle to drive to the area in response to determining, based on the second location data, that the remote computing device is not moving away from at least one of the area and the drop-off location.

In some embodiments, the remote computing device comprises at least one of an accelerometer and a gyroscope. Some embodiments comprise using at least one of the accelerometer and the gyroscope to collect movement data. Some embodiments comprise prompting the first self-driving vehicle to drive to the area in response to determining, based on the movement data, that the rider is not at least one of moving away from the area, moving away from the drop-off location, and moving more than a predetermined threshold.

In some embodiments, after prompting (e.g., by at least one of the vehicle management system, a computer system, a self-driving vehicle, and the remote computing device) the self-driving vehicle to drive to the area in response to determining that the second location data is indicative of the remote computing device having returned to the area, some embodiments comprise prompting (e.g., by the vehicle management system) the first self-driving vehicle to drive away from the area in response to determining (e.g., by at least one of the vehicle management system, a computer system, a self-driving vehicle, and the remote computing device) that the second location data is indicative of the remote computing device moving away from at least one Some embodiments comprise prompting the first self-driving vehicle to drive to an area within 100 feet and/or within 250 feet of the drop-off location to pick up the rider in response to determining (e.g., by at least one of the vehicle management system, a computer system, a self-driving vehicle, and the remote computing device) that the second location data is indicative of the remote computing device moving toward the area.

Some embodiments comprise prompting, by the remote computing device, the rider to at least one of request a ride, confirm the rider wants the ride, cancel a pending pick up, enter a pick-up time, and enter a pick-up location, wherein the prompting is in response to determining (e.g., by at least one of the vehicle management system, the vehicle, and the remote computing device) that the second location data is indicative of the remote computing device moving toward an area within 100 feet and/or within 250 feet of the drop-off location.

Some embodiments comprise estimating (e.g., by at least one of the vehicle management system, a computer system, a self-driving vehicle, and the remote computing device) a first amount of time that the first self-driving vehicle is away from a first area within 100 feet, within 250 feet, within one mile, and/or within three miles of the drop-off location. Some embodiments comprise estimating (e.g., by at least one of the vehicle management system, a computer system, a self-driving vehicle, and the remote computing device) a second amount of time that the remote computing device is away from a second area within 100 feet and/or within 250 feet of the drop-off location.

Some embodiments comprise prompting (e.g., by at least one of the vehicle management system, the computer system, a self-driving vehicle, and the remote computing device) the first self-driving vehicle to drive to a third area within 100 feet and/or within 250 feet of the drop-off location to pick up the rider in response to determining that the second location data is indicative of the remote computing device moving toward the area and in response to determining that the first amount of time is at least fifty percent of the second amount of time.

In some embodiments, a memory of the vehicle management system comprises a pick-up time chosen by the rider and a third location data indicative of a pick-up location chosen by the rider. Some embodiments comprise prompting, by the remote computing device, the rider to at least one of request a ride, confirm the rider wants the ride, and cancel a pending pick up. The prompting can be in response to determining that the second location data is indicative of the remote computing device having arrived at a pick-up area within 100 feet and/or within 250 feet of the pick-up location prior to the pick-up time. The prompting can be in response to determining that the second location data is indicative of the remote computing device moving towards an area within 100 feet and/or within 250 feet of the pick-up location prior to the pick-up time. The prompting can be in response to determining that the second location data is indicative of the remote computing device moving towards an area (for at least a predetermined period of time) within 100 feet and/or within 250 feet of the pick-up location prior to the pick-up time.

In some embodiments, a memory of the vehicle management system comprises a pick-up time chosen by the rider. Some embodiments comprise overriding the pick-up time previously chosen by the rider in response to determining (e.g., by the vehicle management system) that the second location data is indicative of the remote computing device having returned to the area. Some embodiments comprise overriding the pick-up time previously chosen by the rider in response to determining (e.g., by the vehicle management system) that the second location data is indicative of the remote computing device moving towards the area.

In some embodiments, a memory of the vehicle management system comprises a third location data indicative of a pick-up location chosen by the rider. Some embodiments comprise prompting (e.g., by the vehicle management system) the first self-driving vehicle to drive to an area within 100 feet and/or within 250 feet of the pick-up location to pick up the rider in response to determining (e.g., by the vehicle management system) that the second location data is indicative of the remote computing device (and thus the rider) having arrived at the area. Some embodiments comprise prompting (e.g., by the vehicle management system) the first self-driving vehicle to drive to an area within 100 feet and/or within 250 feet of the pick-up location to pick up the rider in response to determining (e.g., by the vehicle management system) that the second location data is indicative of the remote computing device moving toward the area.

In some embodiments, the memory comprises a pick-up time selected by the rider. Some embodiments comprise overriding the pick-up time and prompting (e.g., by the vehicle management system) the first self-driving vehicle to drive to the area to pick up the rider prior to the pick-up time. The overriding and the prompting can be in response to determining that the second location data is indicative of the remote computing device (and thus the rider) having arrived at the area prior to the pick-up time.

In some embodiments, the area comprises a first area that includes the drop-off location. In some embodiments, the area comprises a second area that includes a pick-up location selected by the rider but does not include the drop-off location.

In some embodiments, a memory of the vehicle management system comprises a third location data indicative of a pick-up location chosen by the rider. Some embodiments comprise prompting (e.g., by the vehicle management system) the first self-driving vehicle to drive to an area within 100 feet and/or within 250 feet of the pick-up location to pick up the rider in response to determining that the second location data is indicative of the remote computing device moving toward the area.

In some embodiments, the computer system comprises at least one processor and a memory having program instructions that when executed by the at least one processor are configured to estimate a first amount of time that the first self-driving vehicle is away from a first area within feet and/or within two miles of the drop-off location, and estimate a second amount of time that the remote computing device is away from a second area within 100 feet and/or within 500 feet of the drop-off location. The computer system can be configured to automatically prompt the first self-driving vehicle to drive to a third area within 100 feet and/or within 250 feet of the drop-off location to pick up the rider in response to determining that the second location data is indicative of the rider moving toward the area and/or in response to determining that the second amount of time is within plus or minus fifty percent of the first amount of time.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
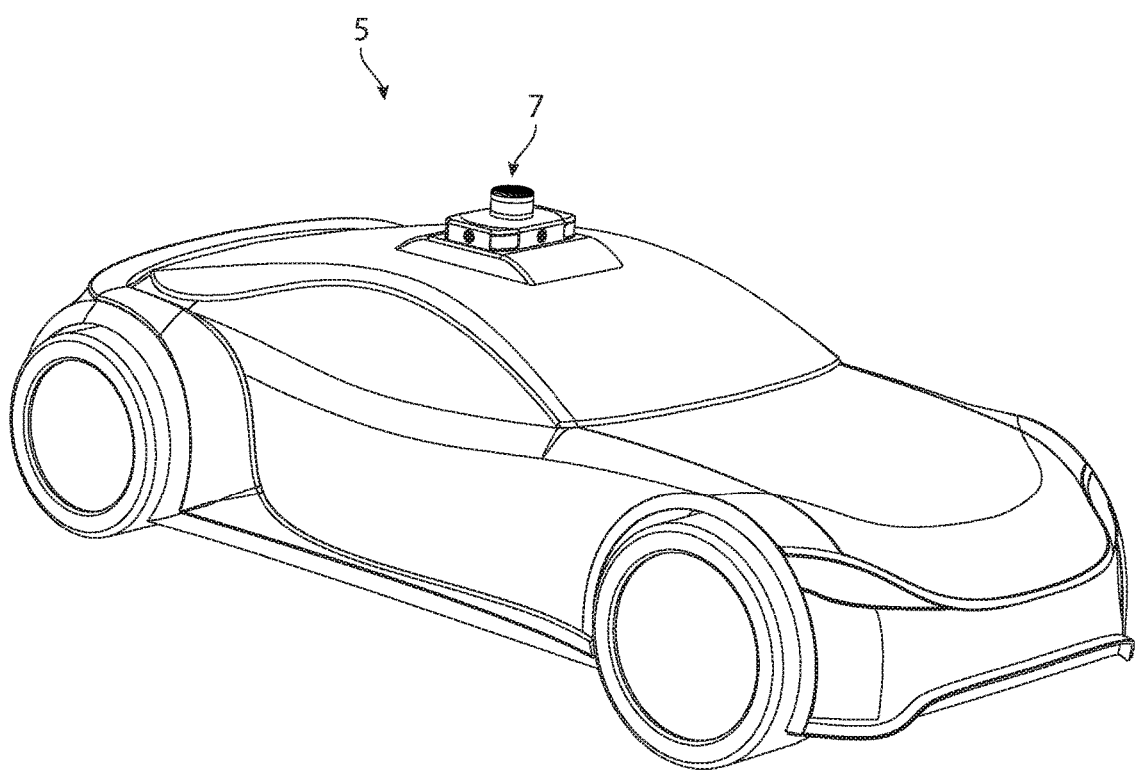
FIG. 1 illustrates a perspective view of a self-driving vehicle, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving vehicles are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Some embodiments can be used with self-driving vehicles. Embodiments, however, are not limited to self-driving vehicles and can be used with non-self-driving vehicles.

As used herein, "location" is used broadly and is not limited to a street address. A location can be a Global Positioning System ("GPS") location and can be any other location indicator. A location can be an outdoor location. A location can be an indoor location (e.g., a location inside a large shopping center, an apartment complex or other building).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors.

Some embodiments use Global Positioning System ("GPS") hardware to determine an outdoor location of a remote computing device. GPS can include the system of satellites put into orbit and maintained by the U.S. Department of Defense, Russia's GLONASS satellite system, assisted GPS systems, and/or any satellite system used to provide location data.

In some embodiments, each system comprises at least one processor and a memory comprising program instructions that when executed by the at least one processor cause the system to perform any of the method steps described herein and/or incorporated by reference.

FIG. 1 illustrates a perspective view of a self-driving vehicle 5. The self-driving vehicle 5 can include a detection system 7 configured to detect objects (e.g., cars, pedestrians, other vehicles, buildings, fire hydrants, trees, lane markers, guard rails, roadway barriers, sidewalks, roadway signs, traffic lights) located around the self-driving vehicle 5. Various sensors of the detection system 7 can sense objects even closer than an inch away (e.g., by using ultrasonic sensors) and even farther away than 100 yards (e.g., using long-range radar).

Figure 2:
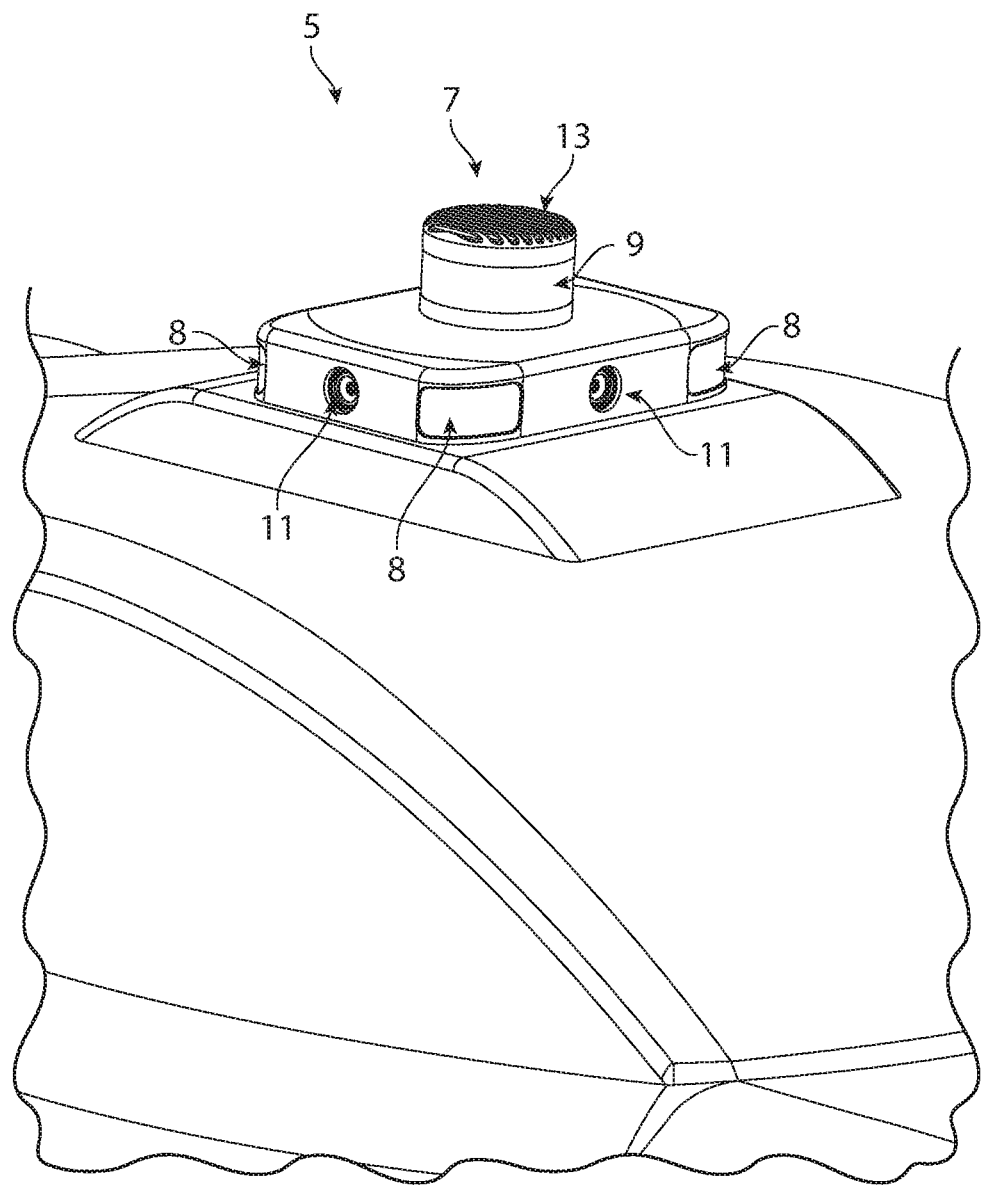
FIG. 2 illustrates a perspective view of a top side, a front side and a passenger side of a detection system, according to some embodiments.
Figure 3:
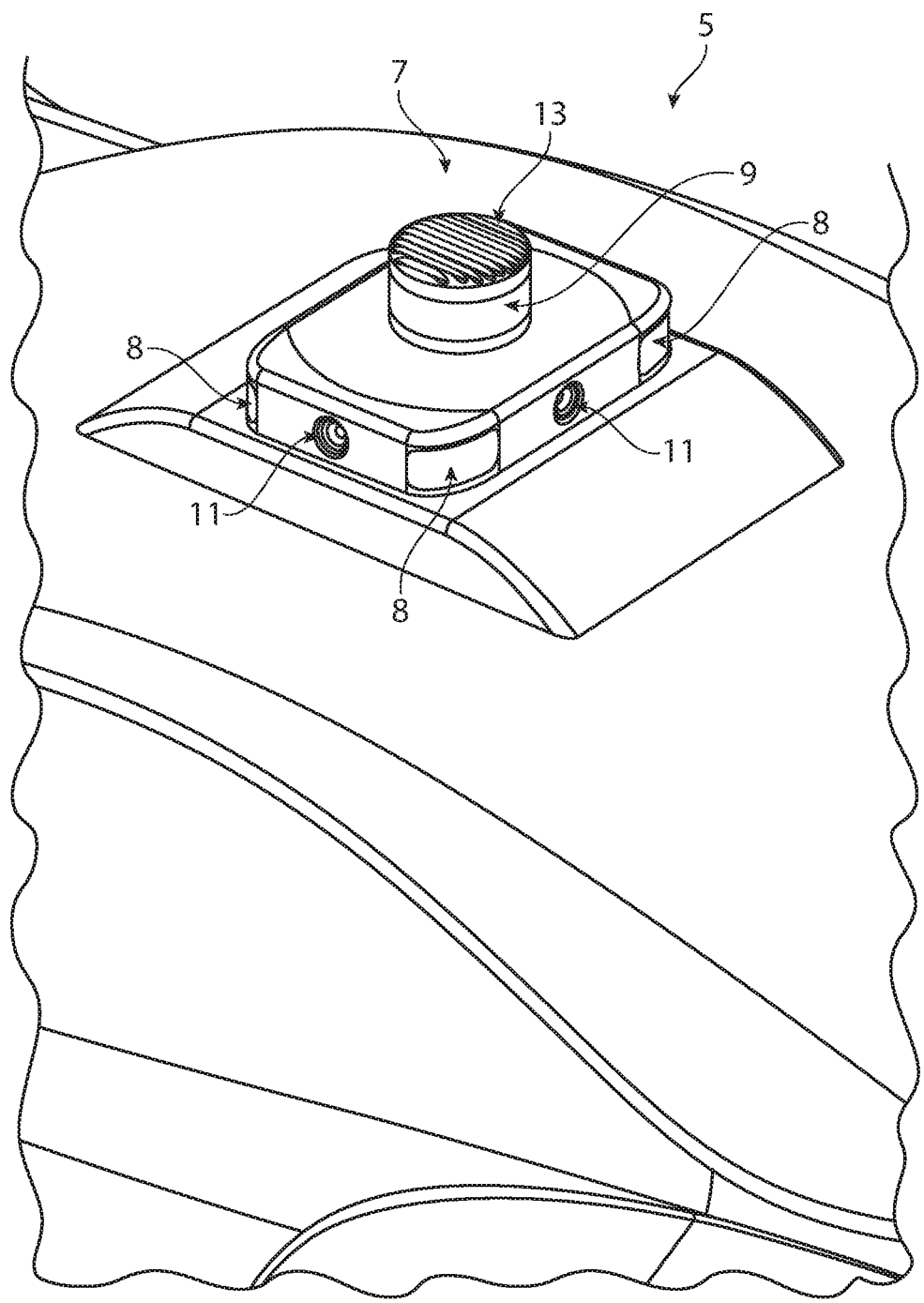
FIG. 3 illustrates a perspective view of the top side, a backside side and a driver side of the detection system, according to some embodiments.
Figure 4:
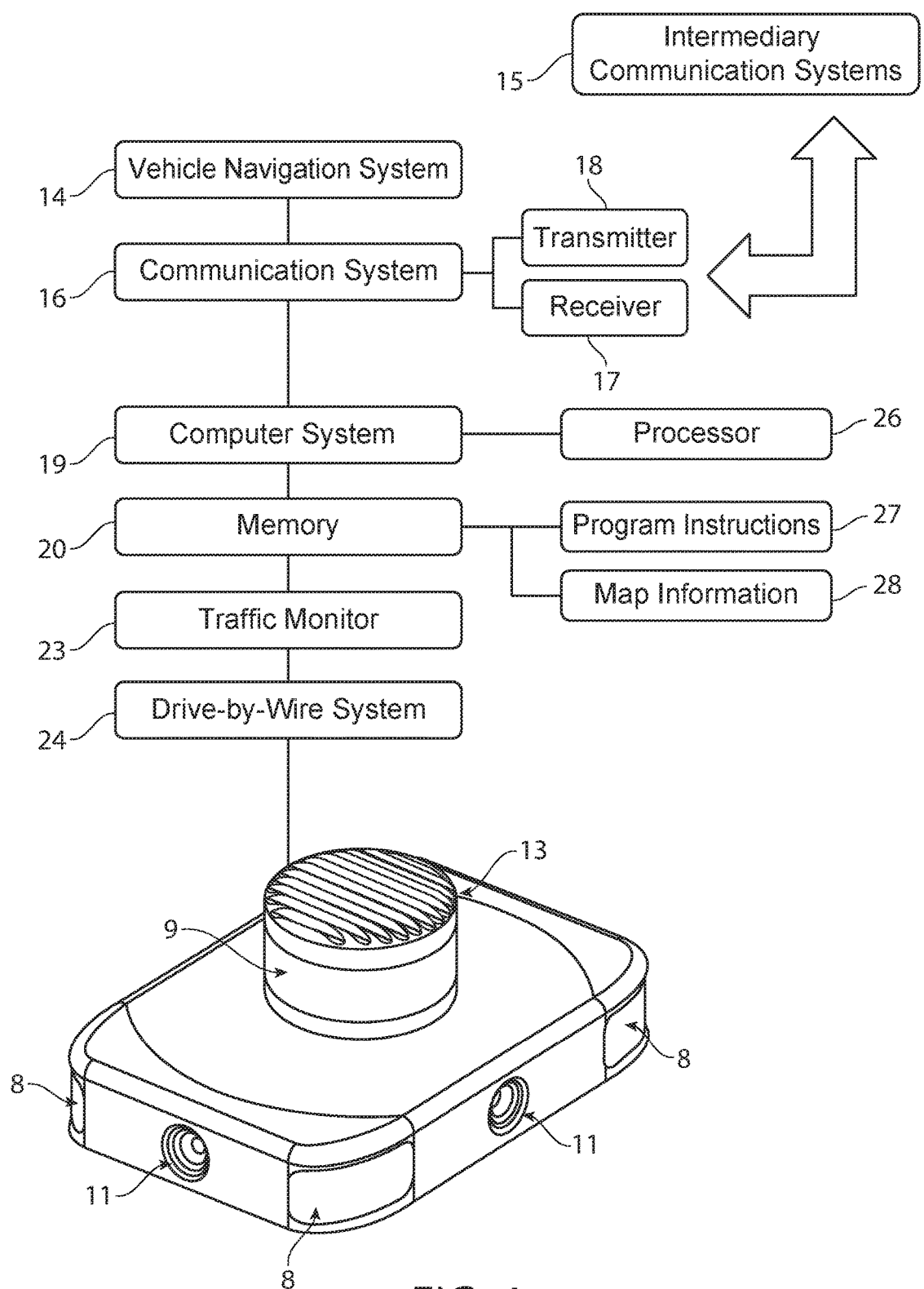
FIG. 4 illustrates a diagrammatic view of portions of a self-driving vehicle, according to some embodiments.

FIG. 2 illustrates a perspective view of the top side, the front side and the passenger side of the detection system 7. FIG. 3 illustrates a perspective view of the top side, the backside side and the driver side of the detection system 7. FIG. 4 illustrates a diagrammatic view of portions of a self-driving vehicle 5, according to some embodiments.

The detection system 7 can comprise radar 8, lidar 9, ultrasonic sensors, cameras 11, and any other sensing devices configured to enable the vehicle 5 to detect objects.

The self-driving vehicle 5 illustrated in FIGS. 1-4 includes a detection system 7 mounted to the roof of the self-driving vehicle 5. In some embodiments, however, the components of the detection system 7 are mounted on different areas of the self-driving vehicle 5. For example, the ultrasonic sensors can be mounted on the bumpers of the self-driving vehicle 5. The short range of the ultrasonic sensors can make bumper mounting helpful (because the bumper is often closer to the objects being sensed). The cameras 11 can be mounted just behind the windshield (e.g., in the rearview mirror) and just behind other windows. The radars 8 can be mounted near each of the four corners of the self-driving vehicle 5. In the illustrated embodiment, however, the detection system 7 can be contained in one assembly to simplify the integration of the detection system 7 into a vehicle.

The detection system 7 can use cameras 11 mounted around a perimeter (e.g., around a perimeter of the vehicle 5 or around a perimeter of a housing of the detection system 7). As illustrated in FIGS. 1-4, the cameras 11 face forward, backward, left, and right to provide (collectively) a 360 degree view around the vehicle 5. The cameras 11 can be high-resolution cameras covered by a glass window to protect each cameras 11 from water and dirt.

Cameras 11 can be configured to see lane markers on a road. Using cameras 11 to see painted lane markers can be helpful (because painted lane markers sometimes lack enough three dimensional nature to be detected by some other sensors). In addition, cameras 11 can see color differences (e.g., the difference between the color of the asphalt and the color of yellow or white paint of a lane marker). Cameras 11 can see the color of traffic lights (e.g., red, yellow, green).

Cameras 11 sometimes have trouble seeing in situations where the human eye would have trouble seeing (e.g., in fog or rain).

Radars 8 can be very helpful in fog and rain. An object that is not detected by cameras 11 (e.g., due to fog or rain) can be detected by radar 8. Radars 8 can detect the speed of other vehicles and the distance to other vehicles. Radars 8 can also detect objects that are far away.

Radar is an object-detection system that uses radio waves to determine the range, angle, or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar.

Lidar uses light to detect objects. A lidar 9 can be located on the top portion of the detection system 7 to provide a 360 degree view of the area around the self-driving vehicle 5. The lidar 9 can tell the difference between an actual person and a billboard that includes a picture of a person (due to the three dimensional nature of the actual person and the two dimensional nature of the picture of a person).

The lidar 9 can accurately sense the three dimensional nature of the world around the self-driving vehicle 5. The lidar 9 can also measure the distance to objects. Measuring distance can enable the self-driving vehicle 5 to know, for example, if an approaching car is 5 meters away (so there is not enough time to turn in front of the car) or 25 meters away (so there may be enough time to turn in front of the car).

In some embodiments, the lidar 9 is a Velodyne VLS-128 made by Velodyne LiDAR, Inc. having an office in San Jose, Calif. The Velodyne VLS-128 can provide real-time, three-dimensional data with up to 0.1 degree vertical and horizontal resolution, a range of up to 300 meters, and a 360-degree surround view. The VLS-128 can provide the range, resolution and accuracy required by some of the most advanced autonomous vehicle programs in the world.

Many types of lidars can be used. Some embodiments use "incoherent" or direct energy detection (which principally measures amplitude changes of the reflected light). Some embodiments use coherent detection (which in some cases can be well suited for measuring Doppler shifts, or changes in phase of the reflected light). Coherent systems can use optical heterodyne detection.

Lidar can use pulse models. Some lidar embodiments use micropulse or high energy. Micropulse systems can use intermittent bursts of energy. Some lidar embodiments use high-power systems.

Lidar can comprise lasers. Some embodiments include solid-state lasers. Some embodiments include flash lidar. Some embodiments include electromechanical lidar. Some embodiments include phased arrays to illuminate any direction by using a microscopic array of individual antennas. Some embodiments include mirrors (e.g., micro electromechanical mirrors). Some embodiments include dual oscillating plane mirrors, a polygon mirror and/or a scanner (e.g., a dual-axis scanner).

Lidar embodiments can include photodetector and receiver electronics. Any suitable type of photodetector can be used. Some embodiments include solid-state photodetectors (e.g., silicon avalanche photodiodes) and/or photomultipliers.

The motion of the vehicle 5 can be compensated for to accurately determine the location, speed, and direction of objects (such as other vehicles) located outside the vehicle 5. For example, if a first vehicle 5a is heading west at 35 miles per hour and a second vehicle is heading east at an unknown speed, a detection system 7a of the first vehicle 5a can remove the contribution of the 35 miles per hour when determining the speed of the second vehicle.

In some embodiments, motion of the vehicle 5 is compensated for by using position and navigation systems to determine the absolute position, speed, and orientation of the lidar, camera, radar, or other object sensing system. A Global Positioning System ("GPS") receiver and/or an Inertial Measurement Unit ("IMU") can be used to determine the absolute position and orientation of the object sensing system.

Lidar can use active sensors that supply their own illumination source. The energy can hit objects. The reflected energy can be detected and measured by sensors. Distance to the object can be determined by recording the time between transmitted and backscattered pulses and by using the speed of light to calculate the distance traveled. Scanning can be used to create a three dimensional image or map of the area around the vehicle 5.

Embodiments can use a short-range lidar to give the self-driving vehicle 5 a surround view near the self-driving vehicle 5 (to see objects close to the self-driving vehicle 5) and can use a long-range lidar configured to not only detect objects located far from the self-driving vehicle 5, but also to enable zooming into objects that are over 200 meters away. The long-range lidar can be very helpful at high-speed highway situations.

Lidar uses light to detect a distance to an object, a direction to the object, and/or a location of an object. Lidar can use pulsed laser light emitted by a laser.

The light can reflect off objects around the vehicle. These reflections can be detected by a sensor of the lidar. Measuring how long the light takes to return to the sensor and measuring the wavelengths of the reflected light can enable making a three-dimensional model of the object being sensed and of the entire area around the vehicle 5.

FIG. 4 illustrates a diagrammatic view of portions of a self-driving vehicle 5, according to some embodiments. The self-driving vehicle 5 can include a vehicle navigation system 14, a communication system 16 that has a transmitter 18 and a receiver 17, a computer system 19 that has a processor 26, a memory 20 that has program instructions 27 and map information 28, a traffic monitor 23, and a drive-by-wire system 24. In some embodiments, at least some of these items are part of the detection system 7.

The vehicle navigation system 14 can be configured to enable the vehicle 5 to follow a driving route. The vehicle navigation system 14 can direct the vehicle toward a pick-up location.

The communication system 16 can be configured to communicate with a vehicle management system. The communication system 16 can be configured to communicate with a remote computing device of a rider. The communication system 16 can use an antenna 13 to communicate with other vehicles and other devices (such as a vehicle management system and remote computing devices) via intermediary communication systems 15.

Intermediary communication systems 15 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The drive-by-wire system 24 can be a computer-regulated system for controlling the engine, accelerating, braking, steering, signaling, handling, suspension, and/or other functions related to autonomously driving the vehicle 5.

In some embodiments, at least portions of a vehicle management system are located far away from vehicles 5, 5a, 5b, 5c. The vehicle management system can include software that is run on servers. The servers can communicate with vehicles 5, 5a, 5b, 5c via intermediary communication systems 15.

In some embodiments, portions of the vehicle management system are located in one or more vehicles 5, 5a, 5b, 5c and portions of the vehicle management system are located far away from the one or more vehicles 5, 5a, 5b, 5c.

Figure 5:
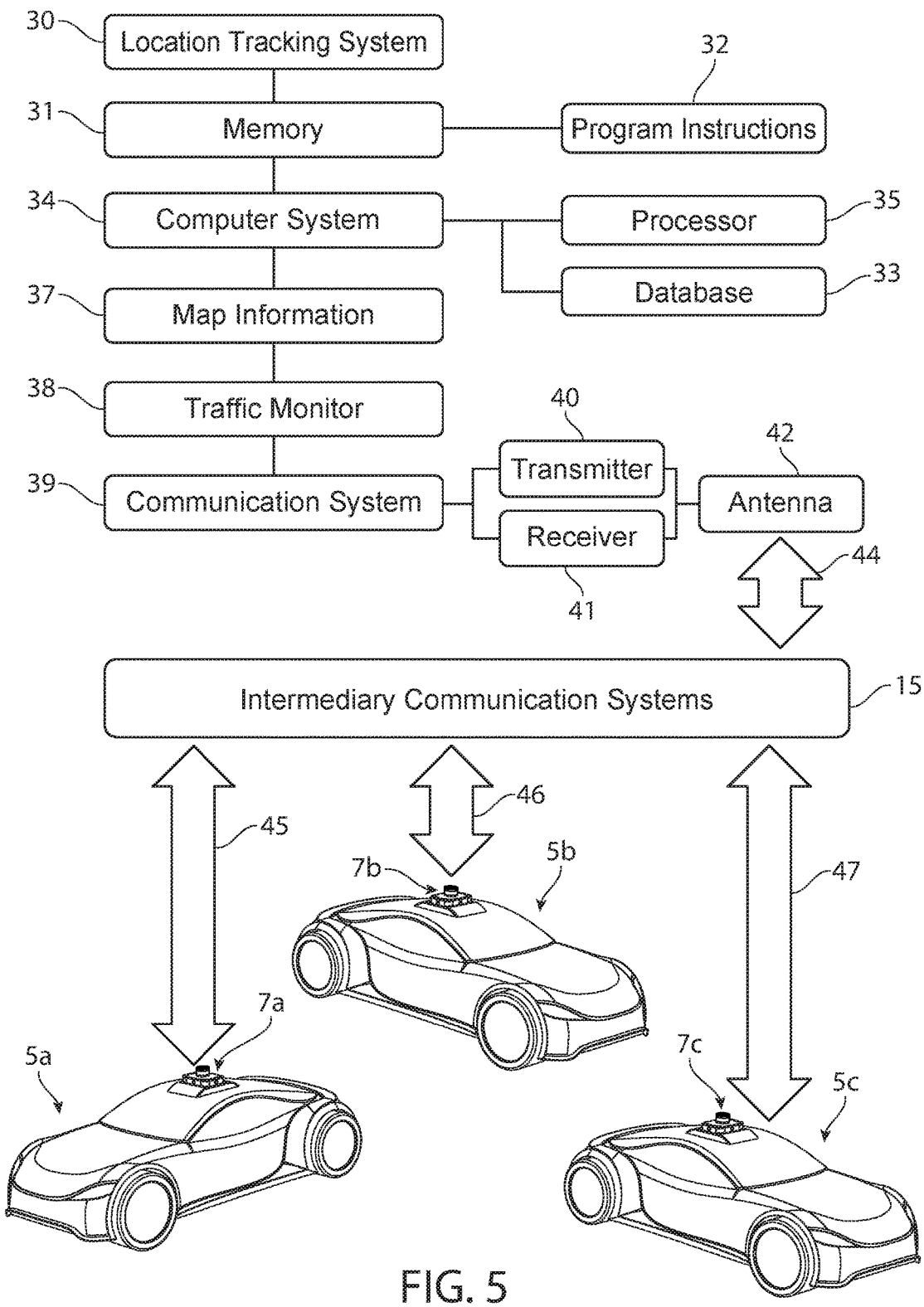
FIG. 5 illustrates a diagrammatic view of portions of a system, according to some embodiments.

FIG. 5 illustrates a diagrammatic view of portions of a vehicle management system, according to some embodiments. FIG. 5 illustrates many optional items. Not all the items illustrated in FIG. 5 are necessarily part of each vehicle management system.

A vehicle management system can comprise a location tracking system 30 configured to track locations of vehicles 5, 5a, 5b, 5c and also configured to track locations of vehicles that have been identified as potentially impaired (according to indications collected by the vehicles 5, 5a, 5b, 5c).

The location tracking system 30 can receive GPS location data of the vehicles 5, 5a, 5b, 5c by the vehicles 5, 5a, 5b, 5c sending their GPS location data to the location tracking system 30 via intermediary communication systems 15.

The vehicles 5, 5a, 5b, 5c can received radio communicates from GPS satellites. These radio communications can include information configured to enable the vehicles 5, 5a, 5b, 5c to calculate their position at any time.

Receiving radio communications (with position data) from three or more GPS satellites can provide data to enable each vehicle and each remote computing device to calculate its own position. Then each vehicle and each remote computing device can send its position data to a vehicle management system (e.g., via intermediary communication systems 15).

Each device can receive radio signals broadcasted from GPS satellites. Then, the device can calculate how far it is away from the broadcasting satellite by determining how long the radio signal (traveling at lightspeed) took to arrive at the device. Trilateration (based on data from at least three GPS satellites) enables the device to know where it is located. The device can then send its location to the vehicle management system. A location tracking system can receive the location data from the vehicle management system, from the device, and/or from any other system.

The location tracking system 30 can comprise a computer configured to receive locations of vehicles and remote computing devices. The location tracking system 30 can comprise a processor 35 and a memory 31 comprising program instructions 32 configured such that when executed by the processor 35 the program instructions 32 cause the location tracking system 30 to monitor locations of vehicles and remote computing devices.

A vehicle management system can comprise a computer system 34 that includes one or more computers of any suitable type. Each computer can include a processor 35 and a memory 31 comprising program instructions 32 configured such that when executed by the processor 35 the program instructions 32 cause the vehicle management system to perform the methods described herein. The computer system 34 can comprise a database 33 having information.

The vehicle management system can comprise map information 37 (including street information, preferred pick-up locations, and preferred drop-off locations) and a traffic monitor 38 configured to receive traffic information from third parties (e.g., Google Maps).

The vehicle management system can comprise a communication system 39 having a transmitter 40, a receiver 41, and an antenna 42. The communication system 39 can be configured to communicate with the vehicles 5, 5a, 5b, 5c. In some embodiments, the communication system 39 communicates with the vehicles 5, 5a, 5b, 5c via intermediary communication systems 15. The antenna 42 can be communicatively coupled to the antenna 13 shown in FIG. 4.

The antenna 42 can be communicatively coupled (e.g., via intermediary communication systems 15) with self-driving vehicles 5, 5a, 5b, 5c that can include a vehicle navigation system 14, a communication system 16 that has a transmitter 18 and a receiver 17, a computer system 19 that has a processor 26, a memory 20 that has program instructions 27 and map information 28, a traffic monitor 23, and a drive-by-wire system 24 (as illustrated in FIG. 4).

Communicative coupling may be via continuous communications or intermittent communications. Intermittent communications can be via periodic communications (e.g., every 1 second, every 60 seconds, every 10 minutes). As used herein, "periodically" does not imply that every period has the same duration. In some embodiments, the communicative coupling is via intermediary communication systems 15.

Each self-driving vehicle 5a, 5b, 5c can include all of the items described in the context of vehicle 5.

Vehicle 5a includes a detection system 7a that can include all of the items described in the context of detection system 7. Vehicle 5b includes a detection system 7b that can include all of the items described in the context of detection system 7. Vehicle 5c includes a detection system 7c that can include all of the items described in the context of detection system 7.

Figure 6:
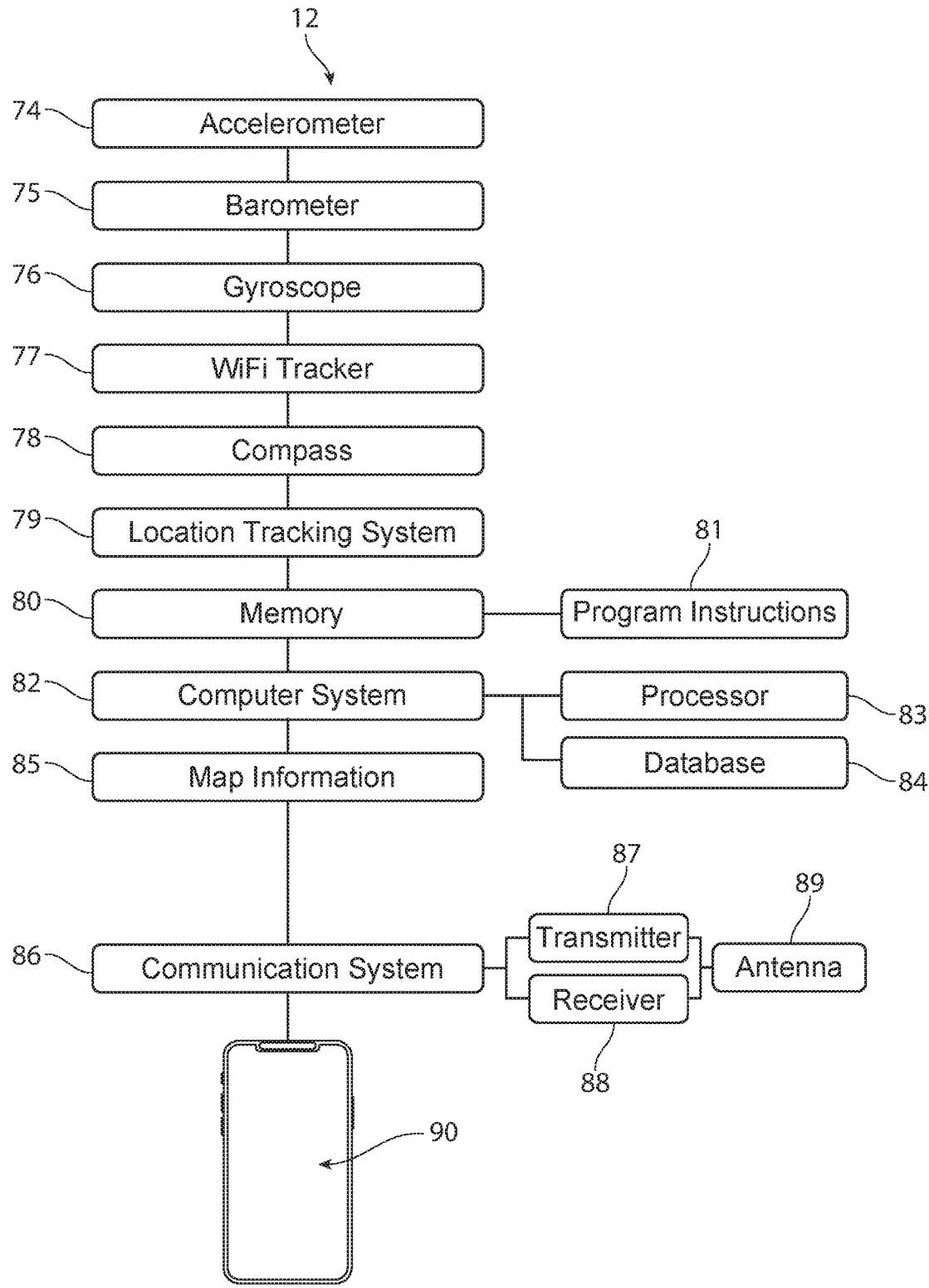
FIG. 6 illustrates a diagrammatic view of a remote computing device, according to some embodiments.

FIG. 6 illustrates a diagrammatic view of a remote computing device 12. Many different types of remote computing devices can be used with the embodiments described herein and/or incorporated by reference. Some remote computing devices do not include all the parts illustrated in FIG. 6. Some remote computing devices include parts not illustrated in FIG. 6.

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

The remote computing device 12 can comprise an accelerometer 74, a barometer 75 (which can include an altimeter), a gyroscope 76, a WiFi tracker 77, a compass 78, a location tracking system 79, a memory 80, a computer system 82 having a processor 83, a database 84 and/or a communication system 86. The communication system can include a transmitter 87, a receiver 88, and/or an antenna 89. The remote computing device 12 can comprise a display screen 90 configured to display images to a rider. The remote computing device 12 can comprise a speaker configured to emit sounds to the rider. The remote computing device 12 can comprise a microphone configured to record sounds from the rider.

Self-driving vehicles can include cars, vans, trucks, buses, scooters, motorcycles, helicopters, quadcopters, flying machines, air taxis, planes, and any motorized vehicle configured to transport a person.

A person (i.e., a rider) can enter (and/or ride on) a first self-driving vehicle 5a or a second self-driving vehicle 5b. Whichever vehicle the rider enters can transport the rider to a drop-off location 50.

Figure 7:
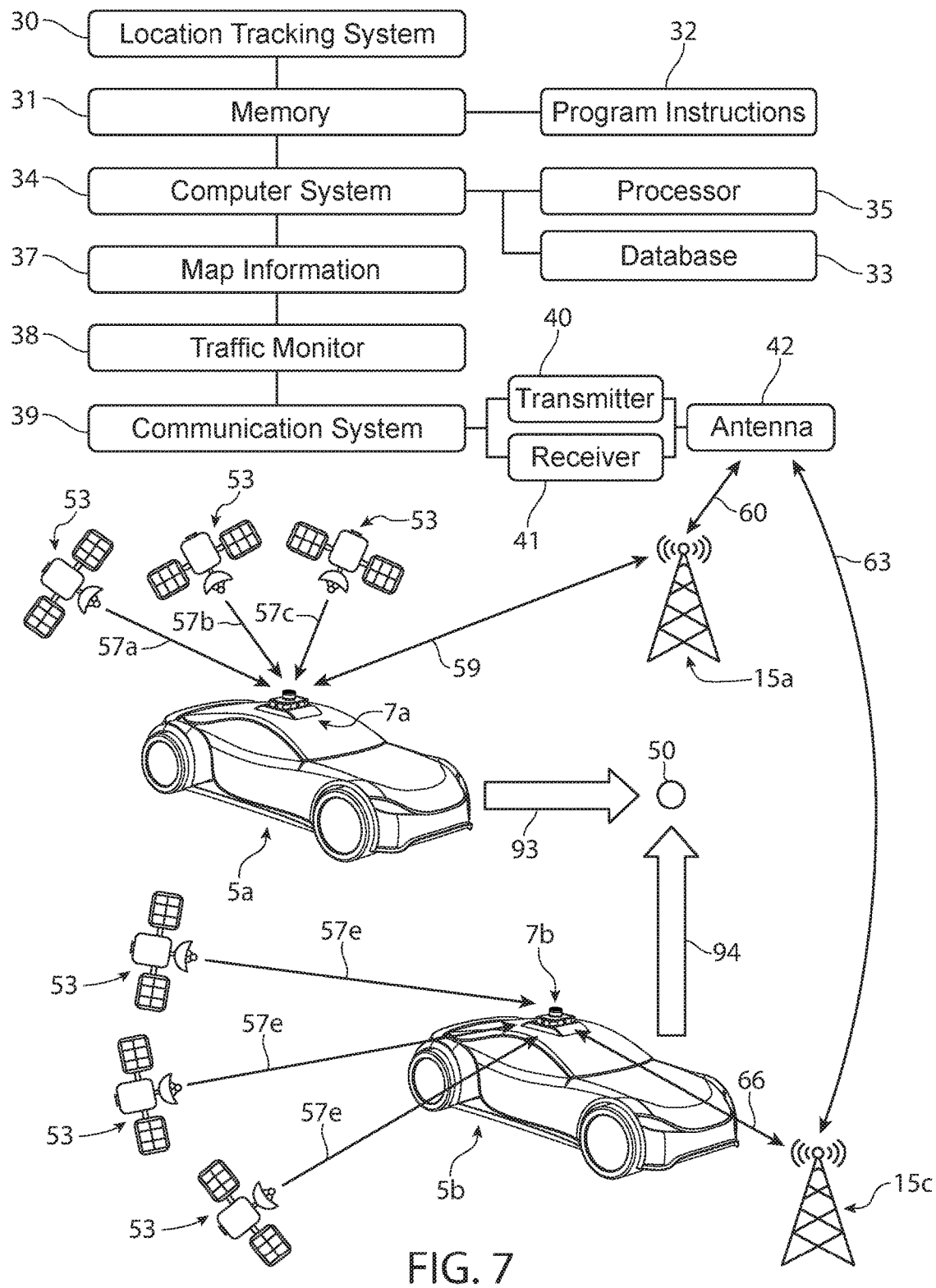
FIG. 7 illustrates a diagrammatic view of a first self-driving vehicle and a second self-driving vehicle moving toward a drop-off location, according to some embodiments.

FIG. 7 illustrates a diagrammatic view of the first self-driving vehicle 5a and the second self-driving vehicle 5b moving toward a drop-off location 50 (as indicated by arrows 93, 94). The rider can be located in either the first self-driving vehicle 5a or the second self-driving vehicle 5b.

In some cases, the first self-driving vehicle 5a transports the rider to the drop-off location 50 and the second self-driving vehicle 5b picks up the rider. A self-driving vehicle fleet can comprise one vehicle, two vehicles, three vehicles or more vehicles. In some embodiments, a self-driving vehicle fleet comprises hundreds or even thousands of vehicles. The vehicles can coordinate to provide efficient transportation to the rider (and/or to many riders).

The first self-driving vehicle 5a can receive communications (e.g., radio signals) from positioning systems 53 (which in some embodiments are GPS satellites). The second self-driving vehicle 5b can receive communications (e.g., radio signals) from positioning systems 53 (which in some embodiments are GPS satellites).

Positioning systems 53 (e.g., GPS satellites) can send communications 57a, 57b, 57c (e.g., radio signals) to the first self-driving vehicle 5a. The first self-driving vehicle 5a can use these communications 57a, 57b, 57c to determine positions of the first self-driving vehicle 5a at various times (e.g., when the first self-driving vehicle 5a drops off the rider at the drop-off location 50).

The first self-driving vehicle 5a can send communications 59 (which can include GPS coordinates of the first self-driving vehicle 5a) to an antenna 42 via intermediary communication systems 15a. Intermediary communication systems 15a can send communications 60 (which can include GPS coordinates of the first self-driving vehicle 5a)

to the antenna 42. (Intermediary communication systems 15a, 15b, 15c can include all of the features and systems described in the context of intermediary communication systems 15.)

Positioning systems 53 (e.g., GPS satellites) can send communications 57e (e.g., radio signals) to the second self-driving vehicle 5b. The second self-driving vehicle 5b can use these communications 57e to determine positions of the second self-driving vehicle 5b at various times.

Receiving radio communications (with position data) from three or more GPS satellites can provide data to enable each vehicle 5a, 5b, 5c and each remote computing device 12 (shown in FIG. 6) to calculate its own position. Then each vehicle 5a, 5b, 5c and each remote computing device 12 can send its position data to a vehicle management system (e.g., via intermediary communication systems 15a, 15c).

The location tracking system 30 can receive GPS location data of the vehicles 5, 5a, 5b, 5c by the vehicles 5, 5a, 5b, 5c sending their GPS location data to the location tracking system 30 via intermediary communication systems 15a, 15c.

The vehicles 5, 5a, 5b, 5c can received radio communicates from GPS satellites. These radio communications can include information configured to enable the vehicles 5, 5a, 5b, 5c to calculate their position at any time.

Each device can receive radio signals broadcasted from GPS satellites. Then, the device can calculate how far it is away from the broadcasting satellite by determining how long the radio signal (traveling at lightspeed) took to arrive at the device. Trilateration (based on data from at least three GPS satellites) enables the device to know where it is located. The device can then send its location to the vehicle management system. A location tracking system 30 can receive the location data from the vehicle management system, from the device, and/or from any other system.

The location tracking system 30 can comprise a computer configured to receive locations of vehicles and remote computing devices. The location tracking system 30 can comprise a processor 35 and a memory 31 comprising program instructions 32 configured such that (when executed by the processor 35) the program instructions 32 cause the location tracking system 30 to monitor locations of vehicles 5, 5a, 5b, 5c and remote computing devices 12.

In some cases, a rider uses a remote computing device 12 to request a ride from the vehicle management system. Then, the vehicle management system prompts a self-driving vehicle 5 to drive to a pick-up location selected by the rider (e.g., via an "app" on the remote computing device 12). Then, the rider must wait for the self-driving vehicle 5. This approach is inconvenient for the rider for many reasons including the rider having to perform several steps to use a remote computing device 12 to request a ride and the rider having to wait for the self-driving vehicle 5 to arrive. (The self-driving vehicle 5 could be many minutes away.) Thus, there is a need for systems and methods that eliminate the need for the rider to perform several steps using a remote computing device "app" to request a ride and/or that reduce the amount of time the rider has to wait for a ride.

Some embodiments predict whether the rider needs a ride, predict when the rider needs a ride and/or predict where the rider needs a ride using location data. Thus, some embodiments described herein and/or incorporated by reference dramatically increase the convenience of using a self-driving vehicle fleet for transportation.

If a rider has to perform several steps using a remote computing device "app" to request a ride and has to wait a long time for a ride, the rider may decide to buy a car and drive herself (rather than using a self-driving car fleet for transportation). Non-self-driving vehicles are far less safe than self-driving vehicles (to both the rider and to other people on the road), so the embodiments described herein and/or incorporated by reference are extremely important to expedite the adoption of self-driving vehicles.

The first self-driving vehicle 5a can send communications 59 (which can include GPS coordinates of the first self-driving vehicle 5a) to an antenna 42 via intermediary communication systems 15a. Intermediary communication systems 15a can send communications 60 (which can include GPS coordinates of the first self-driving vehicle 5a) to the antenna 42.

The second self-driving vehicle 5b can send communications 66 (which can include GPS coordinates of the second self-driving vehicle 5b) to an antenna 42 via intermediary communication systems 15c. Intermediary communication systems 15c can send communications 63 (which can include GPS coordinates of the second self-driving vehicle 5b) to the antenna 42.

In some embodiments, a vehicle management system comprises a self-driving vehicle fleet having at least one of a first self-driving vehicle 5a and a second self-driving vehicle 5b. The self-driving vehicle fleet can be configured to transport a rider.

In some embodiments, a vehicle management system comprises a computer system 34 having at least one computer. The computer system 34 can be configured to be communicatively coupled (e.g., one-time, intermittently, continuously) with a remote computing device 12 of the rider. The computer system 34 can be configured to be communicatively coupled (e.g., one-time, intermittently, continuously) with at least one of the first self-driving vehicle 5a and the second self-driving vehicle 5b.

In some embodiments, a vehicle management system comprises a location tracking system communicatively coupled (e.g., one-time, intermittently, continuously) with the computer system 34 and configured to receive a first location data indicative of a drop-off location 50 where the self-driving vehicle fleet dropped off the rider.

The first location data can include many different types of location data. Location data can include a GPS location, a street address, a location described by any type of positioning system, and/or any other data that is configured to indicate a location. In some embodiments, a GPS location is indicated by two numbers such as 47.606286, −122.341911. Location data can comprise other types of location indicators.

Some embodiments use Assisted GPS, which is a type of GPS. Assisted GPS can draw information from local cell towers and can enhance the performance of standard GPS.

Figure 8:
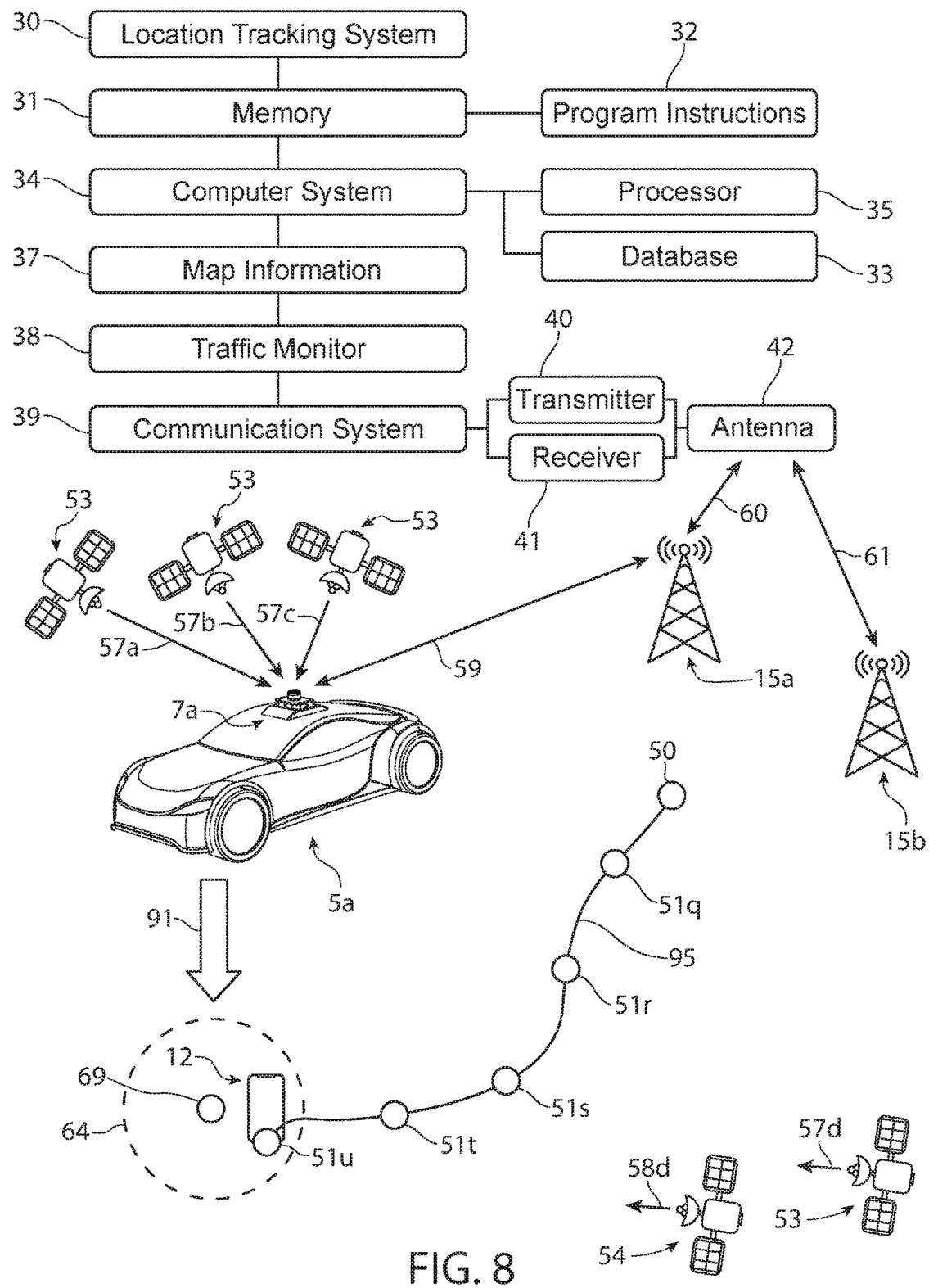
FIG. 8 illustrates a diagrammatic view illustrating a time after a rider was dropped off at the drop-off location, according to some embodiments.

FIG. 8 is a diagrammatic view illustrating a time after the rider was dropped off at the drop-off location 50. The rider walked along a route 95 from the drop-off location 50 to a final location 51u near a pick-up location 69 and within a pick-up area 64. A second location data can comprise one or more locations 51q, 51r, 51s, 51t along the walking route 95. The locations 51q, 51r, 51s, 51t can be calculated by the remote computing device 12 based on communications 57d, 58d received (by the remote computing device 12) from positioning systems 53, 54. Some positioning systems 53 include GPS satellites. Some positioning systems 54 include indoor positioning systems.

Indoor positioning systems can enable the remote computing device 12 (and/or the vehicle management system) to determine a location of the remote computing device 12 inside a building (e.g., using radio waves, lights, magnetic fields, acoustic signals, or other sensory information sent from the indoor positioning systems). Determining a distance from the remote computing device 12 to anchor nodes (e.g., nodes with known positions) can enable the system to determine a precise location of the remote computing device 12. The method can use the same principles as are used in GPS location determinations (e.g., trilateration). Nodes can be WiFi access points, LiFi access points, Bluetooth beacons, and any other nodes configured to enable a remote computing device 12 to calculate the position of the remote computing device 12.

Some indoor positioning systems use iBeacon. iBeacon was developed by Apple Inc. iBeacon can use Bluetooth Low Energy (BLE) devices that broadcast their identifier (and other information) to nearby remote computing devices 12.

Some positioning systems use telecommunication systems to determine a position of a remote computing device 12 and/or to determine a location of a self-driving vehicle 5a, 5b, 5c. In some embodiments, positioning systems using telecommunication systems use Long-Term Evolution ("LTE") protocols. LTE is one of several standards for high-speed wireless communication for mobile devices and data terminals. LTE can be based on GSM/EDGE and UMTS/HSPA technologies.

Some positioning systems that use telecommunication systems are based on the LTE Positioning Protocol ("LPP"). Some positioning systems that use telecommunication systems are based on the LTE Positioning Protocol Annex ("LPPa").

Some embodiments use Observed Time Difference Of Arrival ("OTDOA"). OTDOA is a positioning feature. OTDOA was introduced in rel9 E-UTRA (LTE radio). In OTDOA, the remote computing device 12 measures the time difference between signals from several E-UTRAN Node Bs. Then, the remote computing device 12 reports these time differences to a specific device in the network (e.g., the Evolved Serving Mobile Location Center, which can be abbreviated as "ESMLC"). Based on these time differences and knowledge of the E-UTRAN Node B locations, the device (e.g., the ESMLC) can calculate the position of the remote computing device 12.

WiFi trackers 77 can analyze WiFi signals (e.g., from several WiFi emitters) to determine if a remote computing device 12 is moving. As the remote computing device 12 moves toward a first WiFi source, the signal will get stronger. As the remote computing device 12 moves away from a second WiFi source, the signal will get weaker. This signal analysis can enable the WiFi tracker 77 to determine if the remote computing device 12 is moving.

In some embodiments, the location tracking system 30 is configured to receive a second location data indicative of at least one location 51q, 51r, 51s, 51t of the remote computing device 12 during at least a portion of a period from after when the self-driving vehicle fleet drops off the rider to before when the self-driving vehicle fleet picks up the rider. The at least one location 51q, 51r, 51s, 51t can comprise indoor locations and/or outdoor locations. The route 95 walked by the rider can move through a building (where indoor locations can be helpful) and can move through outdoor locations (e.g., through a parking lot, through a nature preserve, and/or along a street).

In some embodiments, the pick-up area 64 does not comprise the drop-off location but does comprise a pick-up location 69. Entering the pick-up area 64 can cause the first self-driving vehicle 5a or the second self-driving vehicle 5b to drive to the pick-up area 64 (e.g., as indicated by arrow 91) to pick-up the rider.

In some embodiments, the computer system 34 comprises a memory 31 having a third location data indicative of a pick-up location 69 selected by the rider. The computer system 34 can be configured to automatically prompt the first self-driving vehicle 5a to drive to an area 64 within feet and/or within 250 feet of the pick-up location 69 to pick up the rider in response to determining that the second location data is indicative of the remote computing device 12 (and thus the rider) having arrived at the area 64.

In some embodiments, the memory 31 comprises a pick-up time (e.g., data representing a time of day) selected by the rider. The computer system 34 can be configured to override the pick-up time by (automatically) prompting the first self-driving vehicle 5a to drive to the area 64 to pick up the rider. The computer system 34 can be configured to override the pick-up time in response to determining that the second location data is indicative of the remote computing device 12 having arrived at the area 64 prior to the pick-up time.

In some embodiments, the computer system 34 comprises at least one processor 35 and a memory 31 having a pick-up time selected by the rider and having a third location data indicative of a pick-up location 69 selected by the rider. The memory 31 can comprise program instructions 32 that when executed by the at least one processor 35 are configured to cause the at least one processor 35 to cause the remote computing device 12 to prompt the rider to at least one of request a ride, confirm the rider wants the ride, and cancel a pending pick up.

The remote computing device 12 can display text such as, "Would you like a ride now?" on the display screen 90 to prompt the rider to request a ride. (Of course, many other ways of prompting the rider to request a ride are within the scope of the various embodiments.) The rider can then reply, "Yes" (to receive a ride). The rider can also reply that she would like a ride at a time in the future at the pick-up location 69 or at another pick-up location.

The remote computing device 12 can prompt the rider to confirm that the rider wants a ride in many ways including displaying an icon on the display screen 90. The icon can include text that says, "Click here to confirm that you want a ride."

In some embodiments, the vehicle management system automatically causes the vehicle 5a to drive to the area 64 in response to determining that the remote computing device 12 is located inside the area 64 and/or schedules a pick-up in response to determining that the remote computing device 12 is located inside the area 64. These pending pick ups can be canceled by the rider via the remote computing device 12. In some embodiments, the display screen 90 includes text that says, "A car is on the way and will arrive in five minutes. To cancel this pick up, click here."

The program instructions 32 can be configured to cause the at least one processor 35 to cause the remote computing device 12 to prompt the rider in response to determining that the second location data is indicative of the remote computing device 12 (and thus the rider) having arrived at an area 64 within 100 feet and/or within 250 feet of the pick-up location prior to the pick-up time.

In some embodiments, the vehicle management system determines (based on location data of locations 51q, 51r, 51s, 51t along the path 95) that the remote computing device 12 is moving toward at least one of the pick-up location 69 and the pick-up area 64.

In some embodiments, the computer system 34 comprises a memory 31 having a third location data (e.g., GPS coordinates, a street address) indicative of a pick-up location 69 selected by the rider. The computer system 34 can be configured to automatically prompt the first self-driving vehicle 5a to drive to an area 64 within 100 feet and/or within 250 feet of the pick-up location 69 to pick up the rider in response to determining that the second location data (e.g., of the locations 51q, 51r, 51s, 51t) is indicative of the remote computing device 12 moving toward at least one of the pick-up location 69 and the pick-up area 64.

In some embodiments, a memory 31 of the vehicle management system comprises a pick-up time (e.g., data that indicates a time of day such as 4:21 PM) chosen by the rider. The memory of the vehicle management system can comprise a third location data indicative of a pick-up location 69 chosen by the rider. Some embodiments comprise prompting, by the remote computing device 12, the rider to at least one of request a ride, confirm the rider wants the ride, and cancel a pending pick up. The prompting can be in response to determining that the second location data is indicative of the remote computing device 12 having arrived at a pick-up area 64 within 100 feet and/or within 250 feet of the pick-up location 69 prior to the pick-up time. The prompting can be in response to determining that the second location data is indicative of the remote computing device 12 moving towards an area within 100 feet and/or within 250 feet of the pick-up location 69 prior to the pick-up time.

The prompting can be in response to determining that the second location data is indicative of the remote computing device 12 moving towards an area 64 (for at least a predetermined period of time) within 100 feet and/or within 250 feet of the pick-up location 69 prior to the pick-up time. In some embodiments, detecting (by the vehicle management system) that the remote computing device 12 has been moving toward the pick-up location 69 and/or area 64 for one minute will not cause the vehicle management system to prompt the first self-driving vehicle 5a to drive to the area 64, but detecting (by the vehicle management system) that the remote computing device 12 has been moving toward the pick-up location 69 and/or area 64 for more than one minute and/or more than three minutes will cause the vehicle management system to prompt the first self-driving vehicle 5a to drive to the area 64.

In some embodiments, a memory 31 of the vehicle management system comprises a third location data indicative of a pick-up location 69 chosen by the rider. Some embodiments comprise prompting (e.g., by the vehicle management system) the first self-driving vehicle 5a to drive to an area 64 within 100 feet and/or within 250 feet of the pick-up location 69 to pick up the rider in response to determining (e.g., by the vehicle management system) that the second location data is indicative of the remote computing device 12 having arrived at the area 64 (e.g., as indicated by location 51u).

Some embodiments comprise prompting (e.g., by the vehicle management system) the first self-driving vehicle 5a to drive to an area 64 within 100 feet and/or within 250 feet of the pick-up location 69 to pick up the rider in response to determining (e.g., by the vehicle management system) that the second location data is indicative of the remote computing device 12 moving toward the area 64.

The rider can use the remote computing device 12 to select a pick-up location 69 and a pick-up time (such as 3:00 PM). The vehicle management system can prompt the first self-driving vehicle 5a to be ready to pick up the rider at the area 64 at 3:00 PM. Sometimes, however, the rider may arrive at the area 64 prior to the scheduled pick-up time. For example, the rider might arrive at the area at 2:00 PM.

In some embodiments, the memory 31 comprises a pick-up time selected by the rider. Some embodiments comprise overriding the pick-up time and prompting (e.g., by the vehicle management system) the first self-driving vehicle 5a to drive to the area 64 to pick up the rider prior to the pick-up time. The overriding and the prompting can be in response to determining that the second location data is indicative of the remote computing device 12 having arrived at the area 64 prior to the pick-up time.

In some embodiments, the area 55 (shown in FIG. 11) where the fleet picks up the rider comprises a first area that includes the drop-off location 50. In some embodiments, the area 64 (shown in FIG. 8) where the fleet picks up the rider comprises a second area that includes a pick-up location 69 selected by the rider but does not include the drop-off location 50.

In some embodiments, a memory 31 of the vehicle management system comprises a third location data indicative of a pick-up location 69 chosen by the rider. Some embodiments comprise prompting (e.g., by the vehicle management system and/or by the remote computing device 12) the first self-driving vehicle 5a to drive to an area 64 within 100 feet and/or within 250 feet of the pick-up location 69 to pick up the rider in response to determining that the second location data is indicative of the remote computing device 12 moving toward the area 64. For example, if the remote computing device 12 moves from drop-off location 50 to locations 51a, 51r, 51a, 51t (but has not arrived at location 51u) the system can determine that the remote computing device 12 is moving towards the area 64.

FIG. 7 illustrates a diagrammatic view of the first self-driving vehicle 5a and the second self-driving vehicle 5b moving toward a drop-off location 50 (as indicated by arrows 93, 94). The rider can be located in either the first self-driving vehicle 5a or the second self-driving vehicle 5b. The fleet can drop off the rider at the drop-off location 50. The rider can possess a remote computing device 12 (illustrated in FIGS. 6, 9, 10, and 11).

Figure 9:
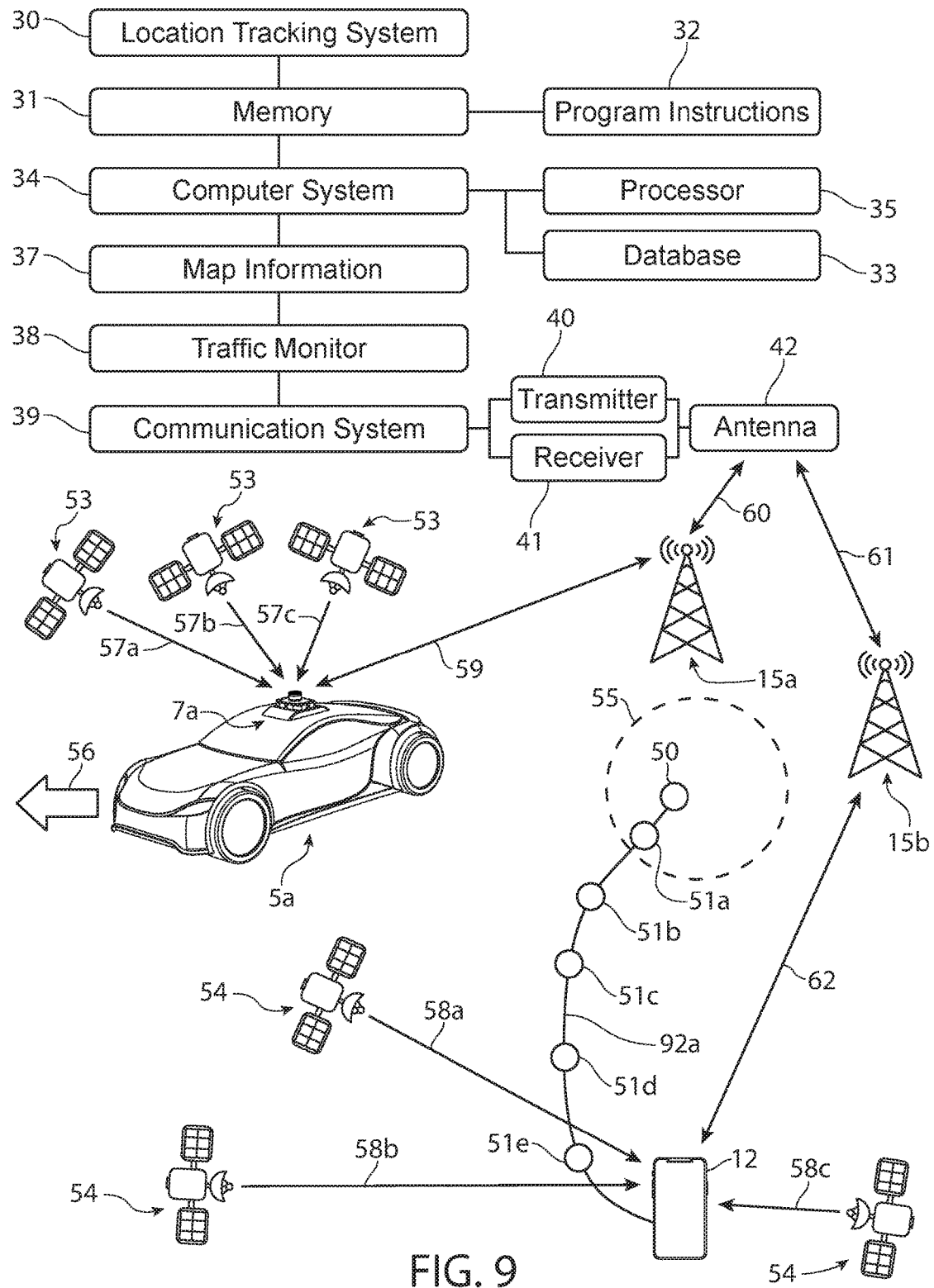
FIG. 9 illustrates a diagrammatic view illustrating another time after a rider was dropped off at the drop-off location, according to some embodiments.

After dropping off the rider, the first self-driving vehicle 5a can move away from the drop-off location 50 and away from the drop-off area 55 (as indicated by arrow 56 in FIG. 9).

FIG. 9 illustrates a route 92a taken by the rider from when she was dropped off at the drop-off location 50. Locations 51a, 51b, 51c, 51d, 51e (e.g., indoor locations and/or outdoor locations) can be determined along the route 92a based on information from outdoor positioning systems and/or indoor positioning systems (e.g., systems 53, 54).

Positioning systems 53 (e.g., GPS satellites) can send communications 57a, 57b, 57c (e.g., radio signals) to the first self-driving vehicle 5a. The first self-driving vehicle 5a can use these communications 57a, 57b, 57c to determine positions of the first self-driving vehicle 5a at various times (e.g., when the first self-driving vehicle 5a drops off the rider).

The first self-driving vehicle 5a can send communications 59 (which can include GPS coordinates of the first self-driving vehicle 5a) to an antenna 42 via intermediary communication systems 15a. Intermediary communication systems 15a can send communications 60 (which can include GPS coordinates of the first self-driving vehicle 5a) to the antenna 42. (Intermediary communication systems 15a, 15b, 15c can include all of the features and systems described in the context of intermediary communication systems 15.)

Positioning systems 54 (e.g., GPS satellites, indoor positioning systems) can send communications 58a, 58b, 58c (e.g., radio signals) to the remote computing device 12. The remote computing device 12 can use these communications 58a, 58b, 58c to determine positions of the remote computing device 12 at various times (e.g., at a drop-off location 50, at locations 51a, 51b, 51c, 51d, 51e, 51f, 51g, 51h, 51i, 51j, 51k, 51m, 51n, and/or at a pick-up location 51p).

The remote computing device 12 can send communications 62 (which can include GPS coordinates of the remote computing device 12) to an antenna 42 via intermediary communication systems 15b. Intermediary communication systems 15b can send communications 61 (which can include GPS coordinates of the remote computing device 12) to the antenna 42.

Figure 10:
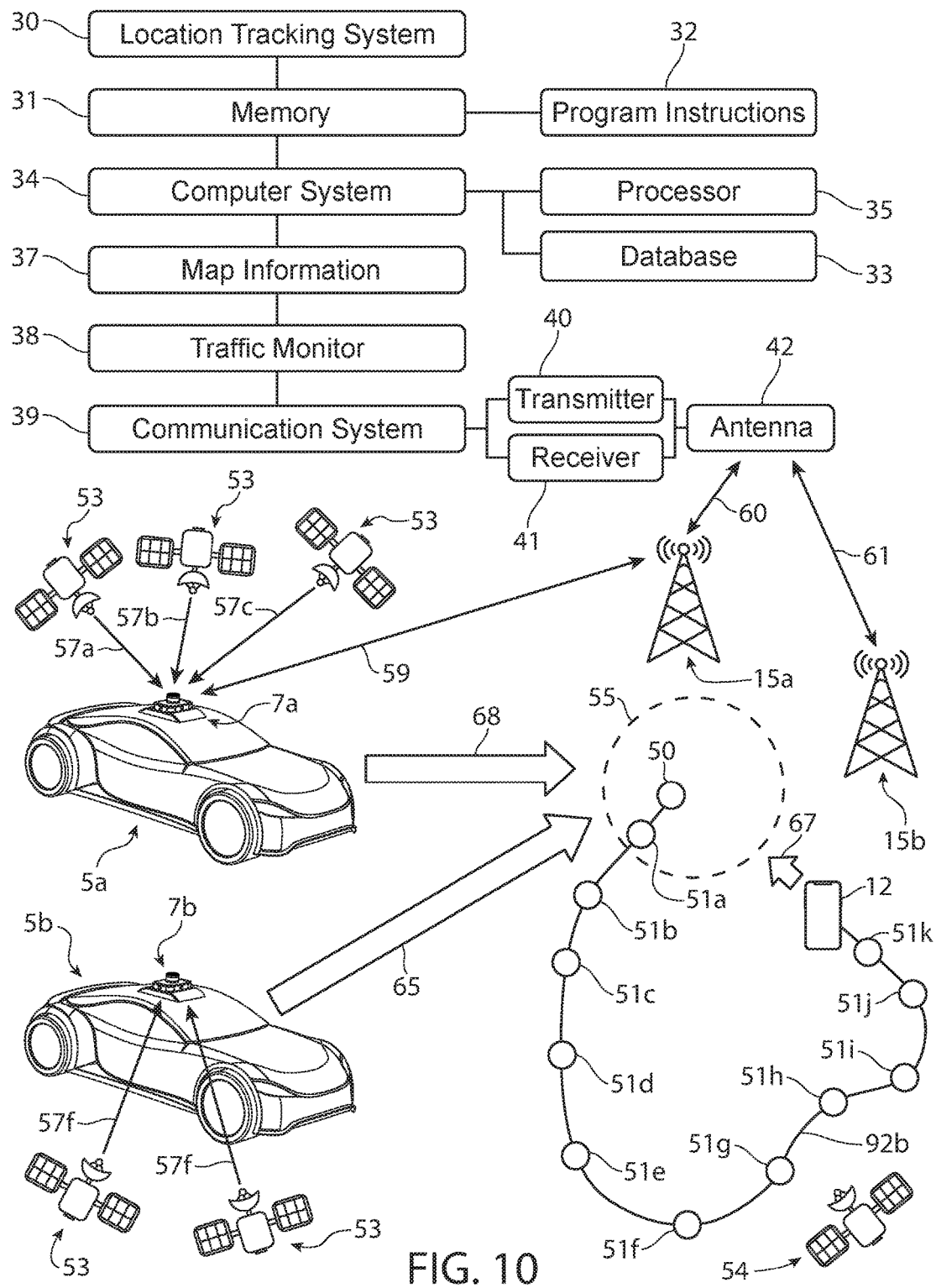
FIG. 10 illustrates a route taken by a rider from when she was dropped off at the drop-off location, according to some embodiments.

FIG. 10 illustrates a route 92b taken by the rider from when she was dropped off at the drop-off location 50. Locations 51a, 51b, 51c, 51d, 51e, 51f, 51g, 51h, 51i, 51j, 51k (e.g., indoor locations and/or outdoor locations) can be determined along the route 92b based on information from outdoor positioning systems and/or indoor positioning systems (e.g., systems 53, 54).

Figure 11:
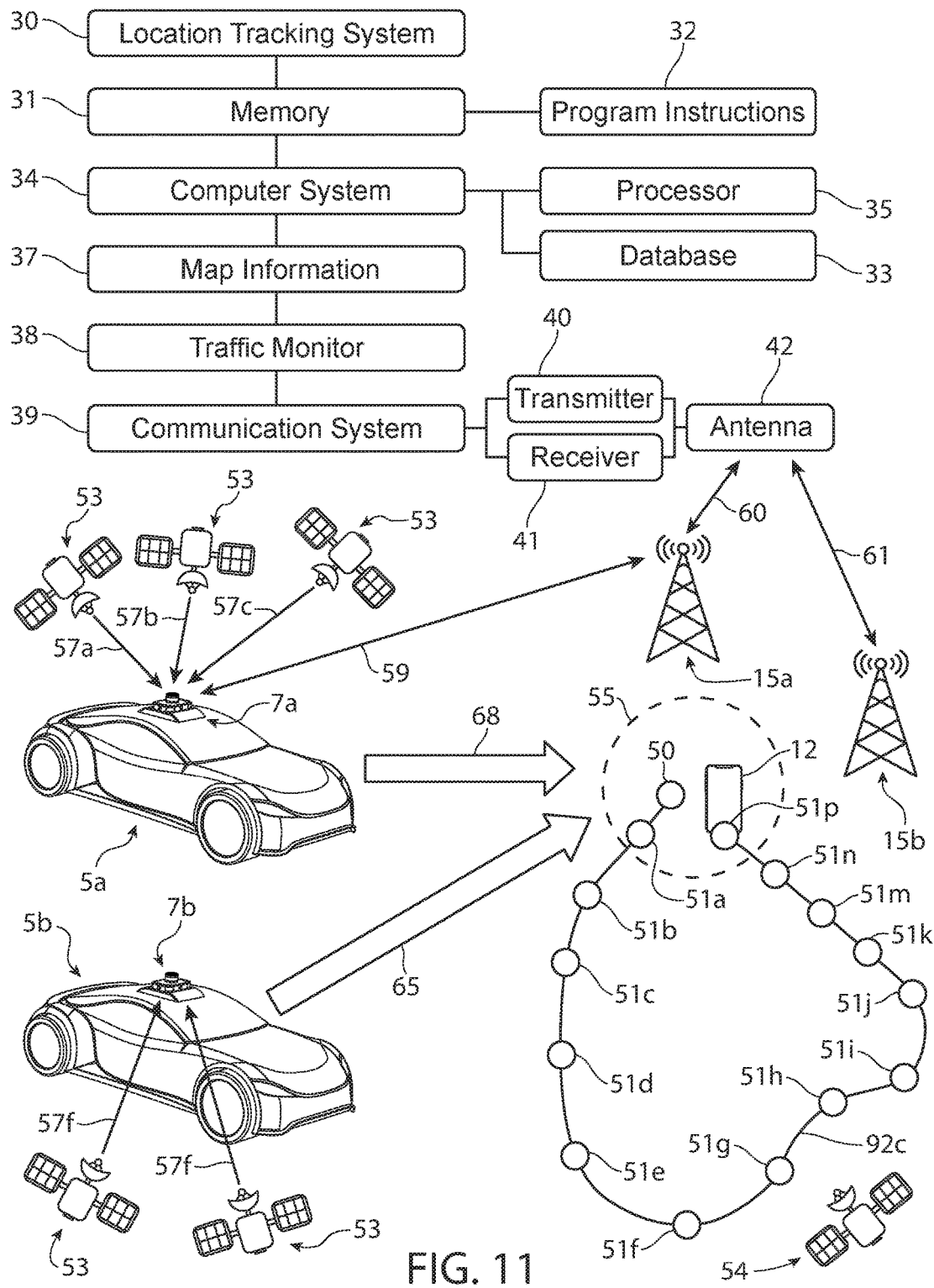
FIG. 11 illustrates a diagrammatic view of the remote computing device having returned to the drop-off area after having left the drop-off area, according to some embodiments.

As illustrated in FIG. 11, the remote computing device 12 can return to an area 55 that includes the drop-off location 50. The rider can walk and/or be transported (e.g., via scooter, bike, train, plane or bus) along the route 92c while having possession of the remote computing device 12. Location 51a indicates the remote computing device 12 moving away from the drop-off location 50. Location 51b indicates the remote computing device 12 having left the drop-off area 55. Locations 51k, 51m, 51n indicate the remote computing device 12 moving toward the drop-off area 55. Location 51p indicates the remote computing device 12 having returned to the drop-off area 55 (after being dropped off by the fleet, moving away from the drop-off location 50, and leaving the drop-off area 55).

Arrow 68 indicates the first self-driving vehicle 5a moving toward the drop-off area 55. Arrow 65 indicates the second self-driving vehicle 5b moving toward the drop-off area 55.

Positioning systems 53 (e.g., GPS satellites) can send communications 57f (e.g., radio signals) to the second self-driving vehicle 5b. The second self-driving vehicle 5b can use these communications 57f to determine positions of the second self-driving vehicle 5b at various times.

FIG. 11 illustrates a diagrammatic view of the remote computing device 12 having returned to the drop-off area 55 after having left the drop-off area 55. In some embodiments, the computer system 34 is configured to prompt at least one of the first self-driving vehicle 5a and the second self-driving vehicle 5b to drive to an area 55 within 100 feet and/or within 250 feet of the drop-off location 50 to pick up the rider in response to determining that the second location data is indicative of the remote computing device 12 (and thus the rider) having returned to the area 55 after being dropped off.

Automatically prompting the fleet to pick up the rider (in response to detecting the remote computing device 12 having returned to an area 55 comprising the drop-off location 50) is highly convenient for the rider. The vehicle management system can compare the drop-off location 50 to a new location 51p of the remote computing device 12 to determine if the fleet should pick up the rider.

In some cases, the vehicle management system will not have a pick-up location selected by the rider and/or will not have a pick-up time selected by the rider. The rider returning to a drop-off area, however, can prompt a self-driving vehicle 5a to drive to the drop-off area to pick up the rider (e.g., without the rider having to tell the vehicle management system that she wants a ride).

In some embodiments, the first location data comprises a first GPS location calculated by at least one of the first self-driving vehicle 5a and the second self-driving vehicle 5b. The second location data can comprise a second GPS location calculated by the remote computing device 12.

In some cases, sending the fleet to pick up the rider could be wasteful if the rider does not want a ride (even though the rider has returned to the drop-off area 55). To guard against unwanted pick-up attempts, in some embodiments, the computer system 34 is configured to prompt at least one of the first self-driving vehicle 5a and the second self-driving vehicle 5b to drive to the area 55 in response to determining, based on the second location data, that the rider is not leaving the area 55. For example, analyzing movements of the remote computing device 12 after the remote computing device returns to the drop-off area 55 can enable the vehicle management system to determine that the rider is not leaving the area 55. In some embodiments, determining, based on the second location data, that the rider is not leaving the area 55 comprises determining that the remote computing device 12 is not moving away from at least one of the area 55 and the drop-off location 50.

Radio signals from GPS satellites can enable a vehicle to determine a first GPS location. A GPS location can include data such as 37.428499, −122.174786. In some embodiments, the first location data comprises a first GPS location based on at least a first radio signal (e.g., communication 57a) and a second radio signal (e.g., a communication 57b) (and in some cases based on additional radio signals 57c) received by at least one of the first self-driving vehicle 5a and the second self-driving vehicle 5b.

In some embodiments, the second location data comprises a second GPS location based on at least a third radio signal and a fourth radio signal (and in some cases additional radio signals) received by the remote computing device 12.

In some embodiments, the first location data comprises a first GPS location calculated by at least one of the first self-driving vehicle 5a and the second self-driving vehicle 5b. The second location data can comprise a first indoor location calculated by the remote computing device 12 based on information received via radio waves (e.g., communications 58a, 58b, 58c) from an indoor positioning system (e.g., positioning system 54) (as illustrated in FIG. 9). The radio waves can be broadcast by iBeacons made by Apple Inc. The positioning systems 54 can be iBeacons, GPS satellites, cell towers, WiFi emitters, or any other suitable type of positioning system.

Referring now to FIG. 11, the vehicle management system can determine that the remote computing device 12 has arrived at location 51p, which is inside the drop-off area 55. The vehicle management system can receive the location 51p (of the remote computing device 12) and then can compare the location 51p to the drop-off location 50 to measure the distance between the location 51p and the drop-off location 50 to determine if the location 51p is within a predetermined distance of the drop-off location 50. There is a chance, however, that the rider is walking through the drop-off area 55 rather than waiting for a ride.

In some embodiments, the computer system 34 is configured to prompt at least one of the first self-driving vehicle 5a and the second self-driving vehicle 5b to drive to the area 55 in response to determining, based on movement data from the remote computing device 12, that the rider is not leaving the area 55. The remote computing device 12 can comprise at least one of an accelerometer 74, a gyroscope 76, and a Wi-Fi tracker 77. The movement data can be based on information from at least one of the accelerometer 74, the gyroscope 76, and the Wi-Fi tracker 77.

A Wi-Fi Tracker 77 can analyze radio waves (e.g., from indoor positioning systems) to determine if the remote computing device 12 is moving (e.g., at a speed indicative of walking). Data from the accelerometer 74 and/or gyroscope 76 can be analyzed by the remote computing device 12 and/or by the computer system 34 to determine if the movement sensed by the accelerometer 74 and/or gyroscope 76 is indicative of walking. If the rider is walking, the likelihood of the wanting a ride is lower than if the rider is standing (e.g., standing in an area 55, 64).

The remote computing device 12 can determine that movement detected by the remote computing device 12 is indicative of the remote computing device 12 not leaving the area 55. For example, lack of movement (e.g., as sensed by a compass 78, by an accelerometer 74, a gyroscope 76, and/or a Wi-Fi tracker 77) can indicate that the remote computing device 12 is not leaving the area 55. Movement that is not indicative of the movement patterns of walking and/or that is less than a movement threshold (e.g., as sensed by a compass 78, an accelerometer 74, a gyroscope 76, and/or a Wi-Fi tracker 77) can indicate that the remote computing device 12 is not leaving the area 55. The remote computing device 12 can send a communication to a computer system 34 (e.g., via intermediary communication systems 15b) regarding movement of the remote computing device 12.

In some embodiments, the vehicle management system comprises program instructions 32 configured to be executed by the remote computing device 12 having at least one of an accelerometer 74, a gyroscope 76, and a Wi-Fi tracker 77. The program instructions 32 can be configured to cause the remote computing device 12 to send a first communication to the computer system 34 in response to the remote computing device 12 using at least one of the accelerometer 74, the gyroscope 76, and the Wi-Fi tracker 77 to determine that the rider is not moving away from at least one of the area 55 and the drop-off location 50. The computer system 34 can be configured to prompt at least one of the first self-driving vehicle 5a and the second self-driving vehicle 5b to drive to the area 55 in response to receiving the first communication.

In some embodiments, the program instructions 32 are configured to cause the remote computing device 12 to send a first communication to the computer system 34 in response to the remote computing device 12 using at least one of the accelerometer 74, the gyroscope 76, and the Wi-Fi tracker 77 to determine that the rider is not moving in a manner indicative of leaving the area 55. A walking motion (e.g., as sensed by accelerometer 74 and/or a gyroscope 76) can be a manner indicative of leaving the area 55. Moving in a direction away from the drop-off location 50 and/or moving in a direction away from the drop-off area 55 (e.g., as sensed by a compass 78, by an accelerometer 74, a gyroscope 76, and/or a Wi-Fi tracker 77) can be a manner indicative of leaving the area 55.

In some embodiments, the computer system is a computer system 82 (labeled in FIG. 6) that is a part of the remote computing device 12. In some embodiments, the computer system is a computer system 34 (labeled in FIGS. 5 and 11) that is not part of the remote computing device 12. In some embodiments, the computer system is a computer system 19 (labeled in FIG. 4) that is not part of the remote computing device 12. Embodiments described herein can use many different types of computer systems, which can be located in many different locations.

In some embodiments, the remote computing device 12 tells the computer system 34 that the remote computing device 12 is not moving away from the drop-off location 50 and/or leaving the drop-off area 55.

Some embodiments comprise program instructions 32 configured to be executed by the remote computing device 12 having at least one of an accelerometer 74 and a gyroscope 76. The program instructions 32 can be configured to cause the remote computing device 12 to send a first communication to the computer system 34 (e.g., a direct communication, an indirect communication) in response to the remote computing device 12 using at least one of the accelerometer 74 and the gyroscope 76 to determine that the rider is not walking. The computer system 34 can be configured to prompt at least one of the first self-driving vehicle 5a and the second self-driving vehicle 5b to drive to the area 55 in response to receiving the first communication.

The remote computing device 12 can use the accelerometer 74 to determine that the rider is not walking by analyzing acceleration data. Walking has an acceleration pattern that is identifiable. In addition, detection less than a threshold level of acceleration can be indicative of the rider not walking.

The remote computing device 12 can use the gyroscope 76 to determine that the rider is not walking by analyzing data from the gyroscope 76. Some gyroscopes are used as gyrocompasses for an inertial guidance system. Some gyroscopes are microelectromechanical systems (MEMS) gyroscopes. A gyroscope 76 can be used to sense direction. When combined with accelerometer data, gyroscope data can be used to determine that a rider is walking in a particular direction. In some cases, the rider returns to the drop-off location before a scheduled pick-up time.

In some embodiments, the computer system 34 comprises at least one processor 35 and a memory 31 having program instructions 32 that when executed by the at least one processor 35 cause the at least one processor 35 to automatically prompt at least one of the first self-driving vehicle 5a and the second self-driving vehicle 5b to drive to an area 55 within 100 feet and/or within 250 feet of the drop-off location 50 to pick up the rider prior to a scheduled pick-up time in response to determining that the second location data is indicative of the remote computing device 12 having returned to the area 55 after being dropped off.

In some cases, the rider is dropped off (by a self-driving vehicle 5a) at the drop-off location 50, the rider moves away from the drop-off location 50, the rider leaves the drop-off area 55, and then the rider returns to the drop-off area 55.

In some embodiments, the computer system 34 comprises at least one processor 35 and a memory 31 having program instructions 32 that when executed by the at least one processor 35 are configured to cause the at least one processor 35 to prompt the first self-driving vehicle 5a to drive to an area 55 within 100 feet and/or within 250 feet of the drop-off location 50 to pick up the rider in response to determining that the second location data is indicative of the remote computing device 12 having returned to the area 55 after being dropped off.

In some cases, the rider leaves the drop-off area 55 and then returns to the drop-off area 55. Then, however, the rider might leave the drop-off area 55 again (without being picked up by the self-driving vehicle fleet). For example, the rider might walk away from the drop-off area 55 after having returned to the drop-off area 55.

In some embodiments, after prompting the first self-driving vehicle 5a to drive to the area 55 in response to determining that the second location data is indicative of the remote computing device 12 having returned to the area 55, the program instructions 32 are configured to cause the at least one processor 35 to prompt the first self-driving vehicle 5a to drive away from the area 55 in response to determining that the second location data is indicative of the remote computing device 12 moving away from at least one of the drop-off location 50 and the area 55. In these embodiments, the program instructions 32 are configured to cause the at least one processor 35 to prompt the first self-driving vehicle 5a to drive away from the area 55 (in response to determining that the second location data is indicative of the remote computing device 12 moving away from at least one of the drop-off location 50 and the area 55) after prompting the first self-driving vehicle 5a to drive to the area 55 in response to determining that the second location data is indicative of the remote computing device 12 having returned to the area 55. In other words, the program instructions 32 can be configured prior to (A) determining that the second location data is indicative of the remote computing device 12 having returned to the area 55 and also prior to (B) prompting the first self-driving vehicle 5a to drive away from the area 55 in response to determining that the second location data is indicative of the remote computing device 12 moving away from at least one of the drop-off location 50 and the area 55.

In some embodiments, the program instructions 32 are configured to cause the at least one processor 35 to prompt the first self-driving vehicle 5a to drive away from the area 55 after the program instructions prompt the first self-driving vehicle 5a to drive to the area 55. The program instructions 32 are configured to cause the at least one processor 35 to prompt the first self-driving vehicle 5a to drive away from the area 55 in response to determining that the second location data is indicative of the remote computing device 12 moving away from at least one of the drop-off location 50 and the area 55.

A fleet of self-driving vehicles 5a, 5b, 5c can drop off and pick up a rider. A first vehicle can drop off the rider and a different vehicle can later pick up the rider.

In some embodiments, the location tracking system is configured to receive the first location data indicative of the drop-off location 50 where the first self-driving vehicle 5a dropped off the rider. The computer system 34 can be configured to prompt (e.g., via program instructions 32) the second self-driving vehicle 5b to drive to an area 55 within 100 feet of the drop-off location 50 to pick up the rider in response to determining that the second location data is indicative of the remote computing device 12 having returned to the area 55 after being dropped off.

The second location data can include a GPS location (or any other type of location). The GPS location being inside the area 55 is indicative of the remote computing device 12 having returned to the area 55.

Referring now to FIG. 10, the computer system 34 can be configured to (e.g., due to program instructions 32) automatically prompt the first self-driving vehicle 5a to drive to an area 55 within 100 feet and/or within 250 feet of the drop-off location 50 to pick up the rider in response to determining that the second location data is indicative of the remote computing device 12 moving toward the area 55. For example, locations 51j, 51k along the route 92b are indicative of the remote computing device 12 moving toward the area 55 (as indicated by arrow 67).

Locations 51j, 51k indicating that the remote computing device 12 is moving toward the area 55 may cause unwanted pick-up attempts. For example, the rider may simply walk 50 feet toward the pick-up area 55 and then turn another direction within a retail store. Moving toward the pick-up area 55 plus moving toward the pick-up area 55 for at least 30 seconds, at least 2 minutes and/or at least 4 minutes can be a more certain indicator of the rider actually being in route to the pick-up area 55.

In some embodiments, the predetermined amount of time (during which the rider must be moving toward the pick-up area 55) scales with a distance from the remote computing device 12 to at least one of the drop-off location 50 and the drop-off area 55. For example, if the rider is one mile away from the drop-off location 50 (and/or the drop-off area 55) the predetermined amount of time can be five minutes. If the rider is only 500 feet away from the drop-off location 50 (and/or the drop-off area 55) the predetermined amount of time can be thirty seconds.

In some embodiments, the computer system 34 is configured to automatically prompt the first self-driving vehicle 5a to drive to an area 55 within 100 feet and/or within 250 feet of the drop-off location 50 to pick up the rider in response to determining that the second location data is indicative of the remote computing device 12 moving toward the area 55 for at least a predetermined amount of time.

Some embodiments minimize (or even eliminate) unwanted pick-up attempts by the detection of certain events causing the system to ask the rider if she wants a ride.

In some embodiments, the computer system 34 comprises at least one processor 35 and a memory 31 having program instructions 32 that when executed by the at least one processor 35 are configured to cause the at least one processor 35 to cause the remote computing device 12 to prompt the rider to at least one of request a ride, confirm the rider wants the ride, cancel a pending pick up, enter a pick-up time, and enter a pick-up location.

The remote computing device can use an "app" to ask the rider to enter a pick-up time and/or enter a pick-up location.

The program instructions 32 can be configured to cause the at least one processor 35 to cause the remote computing device 12 to prompt the rider in response to determining that the second location data is indicative of the remote computing device 12 moving toward an area 55 within 100 feet and/or within 250 feet of the drop-off location 50.

If a self-driving vehicle 5a is very close to a pick-up location, the vehicle management system can avoid prompting the self-driving vehicle 5a to drive to the pick-up location until the rider has arrived at the pick-up location (or at least the vehicle management system is very sure about when the rider will arrive at the pick-up location and/or is very sure the rider actually wants a ride from the fleet).

In some cases, however, the nearest self-driving vehicle 5a is far away (e.g., as measured in travel time and/or in distance) from the pick-up location and/or from the rider. In these cases, the vehicle management system can be more likely to prompt the self-driving vehicle 5a to start moving toward the pick-up location and/or toward the rider (than is often the case when the nearest self-driving vehicle 5a is very close to the pick-up location). For example, the vehicle management system could prompt the self-driving vehicle 5a to start moving toward the pick-up location (even though the vehicle management system is unsure if the rider actually wants a ride) to avoid making the rider wait a long time for a ride (in the event that the rider actually wants a ride).

In some embodiments, at least one of the computer system 34 and the remote computing device 12 is configured to estimate a first amount of time that the first self-driving vehicle 5a is away from a first area 55 within 100 feet, within 900 feet, and/or within one mile of the drop-off location 50. At least one of the computer system 34 and the remote computing device 12 can be configured to estimate a second amount of time that the remote computing device 12 is away from a second area 55 within 100 feet, within 900 feet, and/or within 0.4 miles of the drop-off location 50. The computer system 34 can be configured to automatically prompt the first self-driving vehicle 5a to drive to a third area 55 within 100 feet and/or within 250 feet of the drop-off location 50 to pick up the rider in response to determining that the second location data is indicative of the remote computing device 12 moving toward the area 55 and in response to determining that the first amount of time is at least fifty percent of the second amount of time.

The computer system 34 can be configured to automatically prompt the first self-driving vehicle 5a to drive to a third area 55 within 100 feet and/or within 250 feet of the drop-off location 50 to pick up the rider in response to determining that the second location data is indicative of the remote computing device 12 moving toward the area 55 and in response to determining that the second amount of time is at least one of less than the first amount of time and less than fifty percent greater than the first amount of time.

The computer system 34 can be configured to automatically prompt the first self-driving vehicle 5a to drive to a third area 55 within 100 feet and/or within 250 feet of the drop-off location 50 to pick up the rider in response to determining that the second location data is indicative of the remote computing device 12 moving toward the area 55 and in response to determining that the first amount of time is at least one of greater than the second amount of time and at least fifty percent of the second amount of time.

In some embodiments, each system comprises at least one processor and a memory comprising program instructions that when executed by the at least one processor cause the system to perform method steps.

Some embodiments comprise using a vehicle management system comprising a self-driving vehicle fleet having at least one of a first self-driving vehicle 5a and a second self-driving vehicle 5b. The fleet can be configured to transport a rider.

Some embodiments comprise receiving, by the vehicle management system, a first location data indicative of a drop-off location 50 where the self-driving vehicle fleet dropped off the rider. Some embodiments comprise receiving, by the vehicle management system, a second location data indicative of at least one location (e.g., locations 51a, 51b, 51c, 51d, 51e, 51f, 51g, 51h, 51i, 51j, 51k, 51m, 51n) of a remote computing device 12 of the rider during at least a portion of a period from after when the self-driving vehicle fleet drops off the rider to before when the self-driving vehicle fleet picks up the rider.

Some embodiments comprise prompting, by the vehicle management system, the first self-driving vehicle 5a to drive to an area 55 within 100 feet and/or within 250 feet of the drop-off location 50 to pick up the rider in response to determining (e.g., by at least one of the vehicle management system, a computer system 34, a self-driving vehicle, and the remote computing device 12) that the second location data is indicative of the remote computing device 12 having returned to the area 55 after being dropped off.

In some embodiments, the first location data comprises a first GPS location (e.g., of the drop-off location 50) calculated by at least one of the first self-driving vehicle 5a and the second self-driving vehicle 5b. The second location data can comprise a second GPS location (e.g., one of locations 51a, 51b, 51c, 51d, 51e, 51f, 51g, 51h, 51i, 51j, 51k, 51m, 51n) calculated by the remote computing device 12.

Some embodiments comprise prompting (e.g., by at least one of the vehicle management system, a computer system 34, a self-driving vehicle, and the remote computing device 12) the first self-driving vehicle 5a to drive to the area 55 in response to determining, based on the second location data, (e.g., by at least one of the vehicle management system, a computer system 34, a self-driving vehicle, and the remote computing device 12) that the remote computing device 12 is not moving away from at least one of the area 55 and the drop-off location 50.

In some embodiments, the remote computing device 12 comprises at least one of an accelerometer 74 and a gyroscope 76. Some embodiments comprise using at least one of the accelerometer 74 and the gyroscope 76 to collect movement data. Some embodiments comprise prompting (e.g., by the vehicle management system) the first self-driving vehicle 5a to drive to the area 55 in response to determining, (e.g., by the vehicle management system) based on the movement data, that the rider is not at least one of moving away from the area 55, moving away from the drop-off location 50, and moving more than a predetermined threshold. (Moving more than a predetermined threshold can be indicative of walking.)

In some embodiments, after prompting (e.g., by at least one of the vehicle management system, a computer system 34, a self-driving vehicle, and the remote computing device 12) the self-driving vehicle to drive to the area 55 in response to determining that the second location data is indicative of the remote computing device 12 having returned to the area 55, some embodiments comprise prompting (e.g., by the vehicle management system) the first self-driving vehicle 5a to drive away from the area 55 in response to determining (e.g., by at least one of the vehicle management system, a computer system 34, a self-driving vehicle, and the remote computing device 12) that the second location data is indicative of the remote computing device 12 moving away from at least one of the drop-off location 50 and the area 55.

Some embodiments comprise prompting (e.g., by the vehicle management system) the first self-driving vehicle 5a to drive to an area 55 within 100 feet and/or within 250 feet of the drop-off location 50 to pick up the rider in response to determining (e.g., by at least one of the vehicle management system, a computer system 34, a self-driving vehicle, and the remote computing device 12) that the second location data is indicative of the remote computing device 12 moving toward the area 55.

Some embodiments comprise prompting, by the remote computing device 12, the rider to at least one of request a ride, confirm the rider wants the ride, cancel a pending pick up, enter a pick-up time, and enter a pick-up location, wherein the prompting is in response to determining (e.g., by at least one of the vehicle management system, the vehicle, and the remote computing device 12) that the second location data is indicative of the remote computing device 12 moving toward an area 55 within 100 feet and/or within 250 feet of the drop-off location 50.

Prompting, by the remote computing device 12, the rider to request a ride can comprise sending a push notification to the remote computing device 12. The push notification can be configured to encourage the rider to indicate if she wants a ride. The rider can use an "app" on the remote computing device 12 to select that the rider wants a ride.

Some embodiments comprise estimating (e.g., by at least one of the vehicle management system, a computer system 34, a self-driving vehicle, and the remote computing device 12) a first amount of time that the first self-driving vehicle 5a is away from a first area 55 within 100 feet, within 250 feet, within one mile, and/or within three miles of the drop-off location 50. Some embodiments comprise estimating (e.g., by at least one of the vehicle management system, a computer system 34, a self-driving vehicle, and the remote computing device 12) a second amount of time that the remote computing device 12 is away from a second area 55 within 100 feet and/or within 250 feet of the drop-off location 50.

Some embodiments comprise prompting (e.g., by at least one of the vehicle management system, the computer system 34, a self-driving vehicle, and the remote computing device 12) the first self-driving vehicle 5a to drive to a third area 55 within 100 feet and/or within 250 feet of the drop-off location 50 to pick up the rider in response to determining that the second location data is indicative of the remote computing device 12 moving toward the area 55 and in response to determining that the first amount of time is at least fifty percent of the second amount of time.

In some embodiments, a memory 31 of the vehicle management system comprises a pick-up time (e.g., data indicating a time of day) chosen by the rider. Some embodiments comprise overriding the pick-up time previously chosen by the rider in response to determining (e.g., by the vehicle management system) that the second location data is indicative of the remote computing device 12 having returned to the area 55. Some embodiments comprise overriding the pick-up time previously chosen by the rider in response to determining (e.g., by the vehicle management system) that the second location data is indicative of the remote computing device 12 moving towards the area 55.

In some embodiments, the computer system 34 comprises at least one processor 35 and a memory 31 having program instructions 32 that when executed by the at least one processor 35 are configured to estimate a first amount of time that the first self-driving vehicle 5a is away from a first area 55 within 100 feet and/or within two miles of the drop-off location 50, and estimate a second amount of time that the remote computing device 12 is away from a second area 55 within feet and/or within 500 feet of the drop-off location 50. The computer system 34 can be configured to automatically prompt the first self-driving vehicle 5a to drive to a third area 55 within feet and/or within 250 feet of the drop-off location 50 to pick up the rider in response to determining that the second location data is indicative of the rider moving toward the area 55 and/or in response to determining that the second amount of time is within plus or minus fifty percent of the first amount of time.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle can be any suitable vehicle. For example, the self-driving vehicle can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real-world driving data. In some embodiments, self-driving vehicles sometimes drive themselves, sometimes are driven remotely by a computer system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive itself (e.g., steer and control speed) (e.g., in response to a destination requested by the human).

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

In some embodiments, the remote computing device is an iPhone made by Apple Inc. or an Android phone based on software made by Alphabet Inc. The remote computing device can comprise a speaker configured to emit sounds, a microphone configured to record sounds, and a display screen configured to display images. The remote computing device can comprise a battery configured to provide electrical power to operate the remote computing device.

The phrase "communicatively coupling" can include any type of direct and/or indirect coupling between various items including, but not limited to, a self-driving vehicle, a remote computing device, and a vehicle management system. For example, a remote computing device can be communicatively coupled to a vehicle management system via servers, the Cloud, the Internet, satellites, Wi-Fi networks, cellular networks, and any other suitable communication means.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps can be installed directly on remote computing devices, whereby developers can create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A vehicle management system comprising:
a self-driving vehicle fleet comprising at least one of a first self-driving vehicle and a second self-driving vehicle, wherein the fleet is configured to transport a rider;
a computer system comprising at least one computer and configured to be communicatively coupled with a remote computing device of the rider and at least one of the first self-driving vehicle and the second self-driving vehicle; and a location tracking system communicatively coupled with the computer system and configured to receive a first location data indicative of a drop-off location where the self-driving vehicle fleet dropped off the rider,
wherein the location tracking system is configured to receive a second location data indicative of at least one location of the remote computing device during a period of time from after when the self-driving vehicle fleet drops off the rider to before when the self-driving vehicle fleet picks up the rider, and
wherein the computer system is configured to prompt at least one of the first self-driving vehicle and the second self-driving vehicle to drive to an area within a predetermined distance of the drop-off location to pick up the rider in response to determining that the second location data is indicative of the remote computing device having returned to the area after being dropped off.

2. The vehicle management system of claim 1, wherein the first location data comprises a first GPS location calculated by at least one of the first self-driving vehicle and the second self-driving vehicle, and the second location data comprises a second GPS location calculated by the remote computing device.

3. The vehicle management system of claim 2, wherein the computer system is configured to prompt at least one of the first self-driving vehicle and the second self-driving vehicle to drive to the area in response to determining, based on the second location data, that the rider is not moving away from at least one of the area and the drop-off location.

4. The vehicle management system of claim 1, wherein the first location data comprises a first GPS location based on a first radio signal and a second radio signal received by at least one of the first self-driving vehicle and the second self-driving vehicle, and
the second location data comprises a second GPS location based on a third radio signal and a fourth radio signal received by the remote computing device.

5. The vehicle management system of claim 1, wherein the first location data comprises a first GPS location calculated by at least one of the first self-driving vehicle and the second self-driving vehicle, and the second location data comprises a first indoor location calculated by the remote computing device based on information received via radio waves from an indoor positioning system.

6. The vehicle management system of claim 1, wherein the computer system is configured to prompt at least one of the first self-driving vehicle and the second self-driving vehicle to drive to the area in response to determining, based on movement data from the remote computing device, that the rider is not moving away from at least one of the area and the drop-off location,
wherein the remote computing device comprises at least one of an accelerometer, a gyroscope, and a Wi-Fi tracker, and the movement data is based on information from at least one of the accelerometer, the gyroscope, and the Wi-Fi tracker.

7. The vehicle management system of claim 1, further comprising program instructions configured to be executed by the remote computing device having at least one of an accelerometer, a gyroscope, and a Wi-Fi tracker, wherein the program instructions are configured to cause the remote computing device to send a first communication to the computer system in response to the remote computing device using at least one of the accelerometer, the gyroscope, and the Wi-Fi tracker to determine that the rider is not moving away from at least one of the area and the drop-off location,
wherein the computer system is configured to prompt at least one of the first self-driving vehicle and the second self-driving vehicle to drive to the area in response to receiving the first communication.

8. The vehicle management system of claim 1, further comprising program instructions configured to be executed by the remote computing device having at least one of an accelerometer and a gyroscope, wherein the program instructions are configured to cause the remote computing device to send a first communication to the computer system in response to the remote computing device using at least one of the accelerometer and the gyroscope to determine that the rider is not walking,
wherein the computer system is configured to prompt at least one of the first self-driving vehicle and the second self-driving vehicle to drive to the area in response to receiving the first communication.

9. The vehicle management system of claim 1, wherein the computer system comprises at least one processor and a memory having program instructions that when executed by the at least one processor cause the at least one processor to automatically prompt at least one of the first self-driving vehicle and the second self-driving vehicle to drive to the area within the predetermined distance of the drop-off location to pick up the rider prior to a scheduled pick-up time in response to determining that the second location data is indicative of the remote computing device having returned to the area after being dropped off.

10. The vehicle management system of claim 1, wherein the predetermined distance is 250 feet, and the computer system comprises at least one processor and a memory having program instructions that when executed by the at least one processor are configured to cause the at least one processor to prompt the first self-driving vehicle to drive to the area within 250 feet of the drop-off location to pick up the rider in response to determining that the second location data is indicative of the remote computing device having returned to the area after being dropped off.

11. The vehicle management system of claim 10, wherein after prompting the first self-driving vehicle to drive to the area in response to determining that the second location data is indicative of the remote computing device having returned to the area, the program instructions are configured to cause the at least one processor to prompt the first self-driving vehicle to drive away from the area in response to determining that the second location data is indicative of the remote computing device moving away from at least one of the drop-off location and the area.

12. The vehicle management system of claim 1, wherein the predetermined distance is 250 feet, and the location tracking system is configured to receive the first location data indicative of the drop-off location where the first self-driving vehicle dropped off the rider,
wherein the computer system is configured to prompt the second self-driving vehicle to drive to the area within 250 feet of the drop-off location to pick up the rider in response to determining that the second location data is indicative of the remote computing device having returned to the area after being dropped off.

13. The vehicle management system of claim 1, wherein the predetermined distance is 100 feet, and the computer system is configured to automatically prompt the first self-driving vehicle to drive toward the area within 100 feet of the drop-off location to pick up the rider in response to determining that the second location data is indicative of the remote computing device moving toward the area.

14. The vehicle management system of claim 1, wherein the predetermined distance is 250 feet, and the computer system is configured to automatically prompt the first self-driving vehicle to drive toward the area within 250 feet of the drop-off location to pick up the rider in response to determining that the second location data is indicative of the remote computing device moving toward the area for at least a predetermined amount of time.

15. The vehicle management system of claim 1, wherein the predetermined distance is 250 feet, and
the computer system comprises at least one processor and a memory having program instructions that when executed by the at least one processor are configured to, in response to determining that the second location data is indicative of the remote computing device moving toward the area within 250 feet of the drop-off location, cause the at least one processor to cause the remote computing device to prompt the rider to at least one of request a ride, confirm the rider wants the ride, cancel a pending pick up, enter a pick-up time, and enter a pick-up location.

16. The vehicle management system of claim 1, wherein the area is a first area, and the predetermined distance is a first predetermined distance,
wherein at least one of the computer system and the remote computing device are configured to estimate a first amount of time that the first self-driving vehicle is away from a second area within a second predetermined distance of the drop-off location and estimate a second amount of time that the remote computing device is away from a third area within a third predetermined distance of the drop-off location,
wherein the computer system is configured to automatically prompt the first self-driving vehicle to drive toward a fourth area within a fourth predetermined distance of the drop-off location in response to determining that the second location data is indicative of the remote computing device moving toward the first area and in response to determining that the first amount of time is at least fifty percent of the second amount of time.

17. The vehicle management system of claim 1, wherein the computer system comprises a memory, and
the computer system is configured to automatically prompt the first self-driving vehicle to drive to the area to pick up the rider in response to determining that the second location data is indicative of the remote computing device having returned to the area.

18. The vehicle management system of claim 17, wherein the memory comprises a pick-up time selected by the rider, the computer system is configured to override the pick-up time by prompting the first self-driving vehicle to drive to the area to pick up the rider prior to the pick-up time, and the computer system is configured to override the pick-up time in response to determining that the second location data is indicative of the remote computing device having arrived at the area prior to the pick-up time.

19. The vehicle management system of claim 1, wherein the computer system comprises at least one processor and a memory having a pick-up time selected by the rider,
wherein the memory comprises program instructions that when executed by the at least one processor are configured to, in response to determining that the second location data is indicative of the remote computing device having returned to the area prior to the pick-up time, cause the at least one processor to cause the remote computing device to prompt the rider to at least one of request a ride, confirm the rider wants the ride, and cancel a pending pick up.

20. A method of using a vehicle management system comprising a self-driving vehicle fleet having at least one of a first self-driving vehicle and a second self-driving vehicle, wherein the fleet is configured to transport a rider, the method comprising:
receiving, by the vehicle management system, a first location data indicative of a drop-off location where the self-driving vehicle fleet dropped off the rider;
receiving, by the vehicle management system, a second location data indicative of at least one location of a remote computing device of the rider during a period of time from after when the self-driving vehicle fleet drops off the rider to before when the self-driving vehicle fleet picks up the rider, and
prompting, by the vehicle management system, the first self-driving vehicle to drive to an area within 250 feet of the drop-off location to pick up the rider in response to determining that the second location data is indicative of the remote computing device having returned to the area after being dropped off.

21. The method of claim 20, wherein the first location data comprises a first GPS location calculated by at least one of the first self-driving vehicle and the second self-driving vehicle, and the second location data comprises a second GPS location calculated by the remote computing device,
the method further comprising prompting the first self-driving vehicle to drive to the area in response to determining, based on the second location data, that the remote computing device is not moving away from at least one of the area and the drop-off location.

22. The method of claim 20, wherein the remote computing device comprises at least one of an accelerometer and a gyroscope, the method further comprising:
using at least one of the accelerometer and the gyroscope to collect movement data, and
prompting the first self-driving vehicle to drive to the area in response to determining, based on the movement data, that the rider is not at least one of moving away from the area, moving away from the drop-off location, and moving more than a predetermined threshold.

23. The method of claim 20, wherein after prompting the first self-driving vehicle to drive to the area in response to determining that the second location data is indicative of the remote computing device having returned to the area, the method further comprising:
prompting the first self-driving vehicle to drive away from the area in response to determining that the second location data is indicative of the remote computing device moving away from at least one of the drop-off location and the area.

24. The method of claim 20, further comprising prompting the first self-driving vehicle to drive toward the area within 250 feet of the drop-off location to pick up the rider in response to determining that the second location data is indicative of the remote computing device moving toward the area.

25. The method of claim 20, further comprising prompting, by the remote computing device, the rider to at least one of request a ride, confirm the rider wants the ride, cancel a pending pick up, enter a pick-up time, and enter a pick-up location,
wherein the prompting is in response to determining that the second location data is indicative of the remote computing device moving toward the area within 250 feet of the drop-off location.

26. The method of claim 20, wherein the area is a first area, the method further comprising:
  estimating a first amount of time that the first self-driving vehicle is away from a second area within a first predetermined distance of the drop-off location,
  estimating a second amount of time that the remote computing device is away from a third area within a second predetermined distance of the drop-off location, and
  prompting the first self-driving vehicle to drive toward a fourth area within a third predetermined distance of the drop-off location in response to determining that the second location data is indicative of the remote computing device moving toward the first area and in response to determining that the first amount of time is at least fifty percent of the second amount of time.

27. The method of claim 20, wherein a memory of the vehicle management system comprises a pick-up time chosen by the rider, the method further comprising:
  prompting, by the remote computing device, the rider to at least one of request a ride, confirm the rider wants the ride, and cancel a pending pick up, wherein the prompting is in response to determining that the second location data is indicative of the remote computing device having returned to the area prior to the pick-up time.

28. The method of claim 20, wherein the first location data comprises a first GPS location, and the second location data comprises a second GPS location and a third GPS location,
  after prompting the first self-driving vehicle to drive to the area in response to determining that the second GPS location is indicative of the remote computing device having returned to the area and prior to picking up the rider, the method further comprising:
  prompting the first self-driving vehicle to drive away from the area in response to determining that the third GPS location is indicative of the remote computing device moving away from at least one of the drop-off location and the area.

29. The vehicle management system of claim 1, wherein the computer system comprises a memory having a third location data indicative of a pick-up location selected by the rider, wherein the pick-up location is not located in the area,
  wherein the computer system is configured to override the pick-up location selected by the rider by automatically prompting the first self-driving vehicle to drive to the area to pick up the rider in response to determining that the second location data is indicative of the remote computing device having returned to the area.

30. The vehicle management system of claim 1, wherein the computer system comprises at least one processor and a memory,
  wherein the memory comprises program instructions that when executed by the at least one processor are configured to, in response to determining that the second location data is indicative of the remote computing device having returned to the area, cause the at least one processor to cause the remote computing device to prompt the rider to at least one of request a ride, confirm the rider wants the ride, and cancel a pending pick up.

* * * * *